United States Patent
Kanamaru et al.

(10) Patent No.: US 7,641,946 B2
(45) Date of Patent: Jan. 5, 2010

(54) ADHESIVE FILM AND IMAGE DISPLAY DEVICE

(75) Inventors: Mika Kanamaru, Osaka (JP); Kenichi Okada, Osaka (JP); Toshitaka Takahashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 382 days.

(21) Appl. No.: 11/489,485

(22) Filed: Jul. 20, 2006

(65) Prior Publication Data

US 2007/0031660 A1 Feb. 8, 2007

(30) Foreign Application Priority Data

Aug. 8, 2005 (JP) .............................. 2005-229927
Mar. 29, 2006 (JP) .............................. 2006-091928

(51) Int. Cl.
*B32B 33/00* (2006.01)

(52) U.S. Cl. ...................... 428/1.54; 428/1.3; 428/1.33; 428/1.4; 428/1.5; 428/354; 428/355 R; 428/522; 428/689; 526/277

(58) Field of Classification Search ........................ None
See application file for complete search history.

(56) References Cited

U.S. PATENT DOCUMENTS

| | | | |
|---|---|---|---|
| 4,044,044 A | 8/1977 | Saito | |
| 4,259,117 A | 3/1981 | Yamauchi et al. | |
| 4,433,124 A | 2/1984 | Okamoto et al. | |
| 4,731,282 A | 3/1988 | Tsukagoshi et al. | |
| 5,637,368 A * | 6/1997 | Cadalbert et al. | 428/40.1 |
| 6,512,068 B1 | 1/2003 | Nakatsuka | |
| 6,670,010 B2 | 12/2003 | Nagamoto et al. | |
| 6,846,538 B2 | 1/2005 | Sato et al. | |
| 2004/0209007 A1 | 10/2004 | Satake et al. | |
| 2005/0073633 A1 | 4/2005 | Satake et al. | |
| 2006/0057368 A1 * | 3/2006 | Kobayashi et al. | 428/343 |
| 2006/0188712 A1 * | 8/2006 | Okada et al. | 428/354 |
| 2006/0257760 A1 * | 11/2006 | Mori et al. | 430/7 |

FOREIGN PATENT DOCUMENTS

| | | |
|---|---|---|
| JP | S59-080482 | 5/1984 |
| JP | 59-204679 | * 11/1984 |
| JP | S63-33943 | 9/1988 |
| JP | H04-124601 | 4/1992 |
| JP | H06-198703 | 7/1994 |
| JP | H08-245932 | 9/1996 |
| JP | H10-020118 | 1/1998 |
| JP | 2001-254063 | 9/2001 |
| JP | 2002-258754 | 9/2002 |
| JP | 2003-096420 | 4/2003 |
| JP | 2004-054007 | 2/2004 |
| JP | 2004-78143 | 3/2004 |
| JP | 2004-338379 | 12/2004 |

OTHER PUBLICATIONS

Abstract for JP 59-204679.*
"Dispersant for soft ferrites and ceramics, POIZE 532A", Product Information from KAO Corporation. (url=http://chemical.kao.co.jp/).

* cited by examiner

*Primary Examiner*—Marc S Zimmer
(74) *Attorney, Agent, or Firm*—Jean C. Edwards, Esq.; Akerman Senterfitt

(57) ABSTRACT

An adhesive film prevents static charge on peeling generated when removed from an adherend and also improves adhesion between a base material and an adhesive layer, where an under coat layer containing an organometallic is formed on the base material and then an adhesive layer is formed on the base material. Alternatively, an adhesive film showing high adhesion with a glass substrate, and including an antistatic layer, which prevents static charge on peeling generated when the surface protective film is removed, and improves adhesion between a base material and an adhesive layer, where the adhesive film includes a base material, an adhesive layer made of a water dispersible adhesive including, and an antistatic layer, containing a water soluble or water dispersible conductive material, interposed between them, and the adhesive film is stuck onto an image display device.

17 Claims, 1 Drawing Sheet

ADHESIVE FILM AND IMAGE DISPLAY DEVICE

CROSS REFERENCE TO RELATED APPLICATIONS

This application claims priority from Japanese Patent Application No. 2005-229927 filed Aug. 8, 2005 and Japanese Application No. 2006-091928 filed Mar. 29, 2006, the disclosures of which are herein incorporated by reference in their entirety.

BACKGROUND OF THE INVENTION

1. Field of the Invention

The present invention relates to an adhesive film and an image display device and, more particularly, to an adhesive film used in various industrial fields such as electrics and electronics, semiconductors and optics, and an image display device comprising the adhesive film.

2. Description of the Background Art

It has hitherto been known that an adhesive film comprising a base material and an adhesive layer formed on the base material is stuck onto parts so as to protect parts in a dicing or grinding step in case of producing parts in the fields such as electrics and electronics or semiconductors. This adhesive film is usually removed after the completion of the protection of parts.

However, when the adhesive film is removed from the parts, static electricity (so-called static charge on peeling), between the adhesive film and parts, is generated thereby, to cause problems such as an adverse influence exerted on a circuit of parts and adhesion of dust and rubbish.

Also it has hitherto been known that an adhesive film is stuck onto parts so as to protect parts in a production process in the case of producing parts in the optical fields. This adhesive film is usually removed after being stuck onto a liquid crystal display (LCD).

However, when the adhesive film is removed from the liquid crystal display, static charge on peeling is generated thereby to cause problems of disturbing the liquid crystalline order and images.

Therefore, there is proposed, as an adhesive film including an adhesive optical film capable of preventing the above-mentioned static charge on peeling, an antistatic adhesive film comprising a base material film, an antistatic layer comprising a tin oxide-based, indium oxide-based or zinc oxide-based conductive filler and an organic binder and formed on one principal surface of the base material film, and an adhesive layer formed on a surface of the antistatic layer (see, for example, Japanese Unexamined Patent Publication No. 8-245932).

However, in the antistatic adhesive film proposed in Japanese Unexamined Patent Publication No. 8-245932, it becomes difficult to sufficiently secure adhesion between the base material film and the adhesive layer.

Heretofore, optical films such as polarizing film, phase difference film, luminance improving film, and view-angle expansion film have been used for various industrial purposes and, for example, these optical films are used for sticking onto image display devices such as a liquid crystal display (LCD), organic electroluminescence device (organic EL display device), and plasma display panel (PDP).

As the optical film to be stuck onto these image display devices, an adhesive optical film comprising an optical film laminated with an adhesive is known.

In view of the environmental burden, it has recently been required to reduce the use of an organic solvent, and a solvent-based adhesive containing an organic solvent as a solvent is desired to be replaced by a water dispersible adhesive containing water as a dispersion medium.

As such, the water dispersible adhesive, for example, there is proposed a pressure sensitive adhesive composition comprising a copolymer emulsion in which a copolymer contains 2-ethylhexyl methacrylate of an amount of 10 to 50% by weight based on the entire copolymer and the copolymer has a glass transition temperature of $-25°$ C. or lower (see, for example, Japanese Unexamined Patent Publication No. 2001-254063).

A surface protective film is stuck onto a surface of the adhesive optical film so as to prevent scratches and fouling on the surface of the adhesive optical film in the production process and the following transportation process, and the adhesive optical film is stuck onto the image display device in this state. When the transportation process of the image display device is completed, the surface protective film is usually removed from the adhesive optical film.

However, when the surface protective film is removed from the adhesive optical film, static electricity (so-called static charge on peeling), between the adhesive optical film and the surface protective film is generated thereby to cause disturbance of liquid crystalline order and breakage of a circuit of the image display device onto which the film is stuck, thus resulting in a problem of disturbance of images.

Therefore, there is proposed, as an adhesive film including an adhesive optical film capable of preventing the above-mentioned static charge on peeling, an antistatic adhesive film comprising a base material film, an antistatic layer comprising a tin oxide-based, indium oxide-based or zinc oxide-based conductive filler and an organic binder and formed on one principal surface of the base material film, and an adhesive layer formed on the surface of an antistatic layer (see, for example, Japanese Unexamined Patent Publication No. 8-245932).

However, an adhesive film comprising a conventional water dispersible adhesive including those disclosed in Japanese Unexamined Patent Publication No. 2001-254063 show particularly low adhesion to a hydrophilic adherend such as glass and therefore it has difficulty to firmly stick onto a glass substrate of a liquid crystal display, although adhesion to a hydrophobic adherend such as polyolefin is improved.

Further, with respect to a water dispersible adhesive to be laminated on an optical film, excellent heat resistance and moisture resistance, which results in preventing deterioration of adhesion due to severe heating and humidifying, are required.

Furthermore, in the antistatic adhesive film proposed in Japanese Unexamined Patent Publication No. 8-245932, it becomes difficult to sufficiently secure adhesion between the base material film and the adhesive layer.

SUMMARY OF THE INVENTION

An object of the present invention is to provide an adhesive film which can effectively prevent static charge on peeling generated when removed from an adherend by preventing charge of the adhesive film and also can improve adhesion between a base material and an adhesive layer.

Another object of the present invention is to provide an adhesive film comprising an antistatic layer, which has high adhesion with a glass substrate and is excellent in heat resistance and moist heat resistance, can effectively prevent static charge on peeling generated when a surface protective film is removed by preventing charge of the adhesive film, and can improve adhesion between a base material and an adhesive layer, and to provide an image display device comprising the adhesive film.

The adhesive film of the present invention comprises a base material; an adhesive layer laminated on one or both sides of the base material; and an under coat layer containing an organometallic compound, which is interposed between the base material and the adhesive layer.

In the adhesive film of the present invention, the under coat layer preferably contains a resin.

In the adhesive film of the present invention, the organometallic compound is preferably at least one compound selected from the group consisting of an organozirconium compound, an organotitanium compound and an organoaluminum compound.

In the adhesive film of the present invention, the adhesive layer preferably has a reactive functional group.

In the adhesive film of the present invention, the resin preferably has a reactive functional group.

In the adhesive film of the present invention, the adhesive layer is preferably made of a water dispersible acrylic adhesive.

In the adhesive film of the present invention, the base material is preferably an optical film.

In the adhesive film of the present invention, since the under coat layer contains an organometallic compound, the adhesive film is less likely to be charged and can enhance adhesion between a base material and an adhesive layer. Therefore, the adhesive film of the present invention can be used in various industrial fields as an adhesive film, which can effectively prevent static charge on peeling generated when removed from an adherend and also has high adhesion between a base material and an adhesive layer.

The adhesive film of the present invention comprises a base material, an adhesive layer laminated on at least one side of the base material, and an antistatic layer interposed between the base material and the adhesive layer, the adhesive layer being made of an adhesive composition comprising, as raw monomers, an alkyl(meth)acrylate ester whose alkyl group has 4 to 18 carbon atoms, a carboxyl group-containing vinyl monomer and a phosphoric acid group-containing vinyl monomer represented by the following general formula (1), and also optionally comprising, as row monomers, a copolymerizable vinyl monomer which is copolymerizable with the above monomers, wherein with respect to a proportion of the raw monomers, an amount of the alkyl (meth)acrylate ester is from 60 to 99 parts by weight based on 100 parts by weight of a total amount of the raw monomers, and a total amount of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers, the antistatic layer contains a water soluble or water dispersible conductive material:

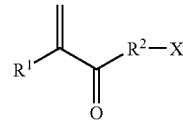

(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3), $$-(O-C_nH_{2n})_m-\quad (2)$$

in the general formula (2), n represents an integer of 1 to 4, and m represents an integer of 2 or more, and

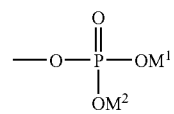

(3)

in the general formula (3), $M^1$ and $M^2$ each independently represents a hydrogen atom or a cation.

In the adhesive film of the present invention, preferably, the adhesive composition further contains, as the copolymerizable vinyl monomer, an alkoxysilyl group-containing vinyl monomer, the proportion being from 0.001 to 1 part by weight based on 100 parts by weight of the total amount of the raw monomers.

In the adhesive film of the present invention, the adhesive composition is preferably a water dispersible adhesive composition.

In the adhesive film of the present invention, the water soluble or water dispersible conductive material is preferably a conductive polymer.

In the adhesive film of the present invention, the conductive polymer is preferably polyaniline and/or polythiophene.

In the adhesive film of the present invention, the water soluble or water dispersible conductive material is preferably an organometallic compound.

In the adhesive film of the present invention, the organometallic compound is preferably at least one compound selected from the group consisting of an organozirconium compound, an organotitanium compound and an organoaluminum compound.

In the adhesive film of the present invention, preferably, the antistatic layer further contains an oxazoline group-containing polymer.

In the adhesive film of the present invention, preferably, the antistatic layer further contains a mixture of an oxazoline group-containing polymer and a compound having a plurality of carboxyl groups.

In the adhesive film of the present invention, preferably, the antistatic layer further contains a polyamine-based polymer.

In the adhesive film of the present invention, the base material is preferably an optical film.

The image display device of the present invention comprises at least one adhesive film, the adhesive film comprising an optical film, an adhesive layer laminated on at least one side of the optical film, and an antistatic layer interposed between the optical film and the adhesive layer, the adhesive layer being made of an adhesive composition comprising, as raw monomers, an alkyl (meth)acrylate ester whose alkyl group has 4 to 18 carbon atoms, a carboxyl group-containing vinyl monomer and a phosphoric acid group-containing vinyl monomer represented by the following general formula (1), and also optionally comprising, as raw monomers, a copolymerizable vinyl monomer which is copolymerizable with the above monomers, wherein with respect to a proportion of the vinyl monomer mixture, an amount of the alkyl (meth)acrylate ester is from 60 to 99 parts by weight based on 100 parts by weight of a total amount of the raw monomers, and a total amount of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers, the antistatic layer contains a water soluble or water dispersible conductive material:

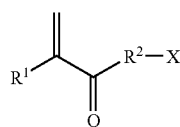

(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3),

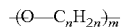

(2)

in the general formula (2), n represents an integer of 1 to 4, and m represents an integer of 2 or more, and

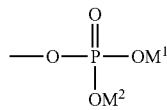

(3)

in the general formula (3), $M^1$ and $M^2$ each independently represents a hydrogen atom or a cation.

The adhesive film of the present invention can attain firm bonding because of high adhesion with a glass substrate. Furthermore, because of excellent heat resistance and moist heat resistance, excellent durability can be attained under a high-temperature atmosphere or a high-temperature and high-humidity atmosphere. Therefore, the image display device of the present invention comprising the adhesive film of the present invention can realize excellent heat resistance and moist heat resistance.

In the adhesive film of the present invention, since the antistatic layer contains a water soluble or water dispersible conductive material, the adhesive film is less likely to be charged and can enhance adhesion between a base material and an adhesive layer. Therefore, the adhesive film of the present invention can be used as an adhesive film, which can effectively prevent static charge on peeling generated when removed from an adherend and also has high adhesion between a base material and an adhesive layer, in various industrial fields.

The image display device comprising the adhesive film of the present invention can realize high antistatic effect and high adhesion between a base material and an adhesive layer.

DESCRIPTION OF THE INVENTION

Figure 1:
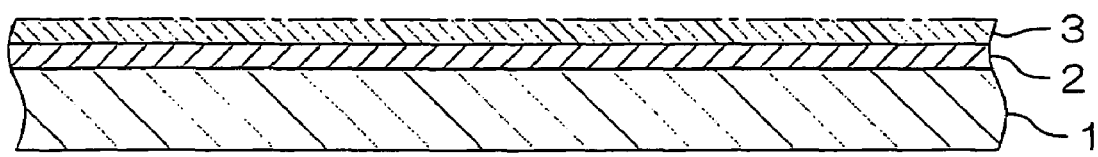
FIG. 1 is an enlarged sectional view showing an adhesive film (adhesive optical film) according to a first embodiment of the adhesive film of the present invention.

An adhesive film according to a first embodiment of the present invention comprises a base material, an adhesive layer laminated on one or both sides of the base material, and an under coat layer containing an organometallic compound and interposed between the base material and the adhesive layer.

In the adhesive film according to the first embodiment of the present invention, an adhesive used in the adhesive layer is those usually used in the adhesive layer, and examples thereof include acrylic adhesive and natural rubber latex-based adhesive. The adhesive is preferably an acrylic adhesive, and more preferably a water dispersible acrylic adhesive.

The acrylic adhesive can be obtained by polymerizing an alkyl (meth)acrylate ester as a principle component with a vinyl monomer mixture containing a reactive functional group-containing vinyl monomer having a reactive functional group and a copolymerizable vinyl monomer which is copolymerizable with the above-mentioned monomer (the alkyl (meth)acrylate ester and the reactive functional group-containing vinyl monomer) as other components.

The alkyl(meth)acrylate ester is an alkyl methacrylate ester and/or an alkyl acrylate ester and is represented, for example, by the following general formula (4):

(4)

in the general formula (4), $R^1$ represents a hydrogen atom or a methyl group, and $R^2$ represents a linear or branched alkyl group having 1 to 18 carbon atoms.

Examples of $R^2$ include methyl group, ethyl group, propyl group, isopropyl group, butyl group, isobutyl group, sec-butyl group, t-butyl group, pentyl group, neopentyl group, isopentyl group, hexyl group, heptyl group, octyl group, 2-ethylhexyl group, isooctyl group, nonyl group, isononyl group, decyl group, isodecyl group, undecyl group, dodecyl group, tridecyl group, tetradecyl group, pentadecyl group, hexadecyl group, heptadecyl group and octadecyl group.

Specific examples of the alkyl (meth)acrylate ester include alkyl (linear or branched alkyl having 1 to 3 carbon atoms) (meth)acrylate esters such as methyl (meth) acrylate, ethyl (meth)acrylate, propyl (meth)acrylate, and isopropyl (meth) acrylate; and alkyl (linear or branched alkyl having 4 to 18 carbon atoms) (meth)acrylate esters such as butyl(meth)acrylate, isobutyl(meth)acrylate, sec-butyl(meth)acrylate, t-butyl (meth)acrylate, pentyl(meth)acrylate, neopentyl(meth)acrylate, isopentyl(meth)acrylate, hexyl(meth)acrylate, heptyl (meth)acrylate, octyl(meth)acrylate, 2-ethylhexyl(meth) acrylate, isooctyl(meth)acrylate, nonyl(meth)acrylate, isononyl(meth)acrylate, decyl(meth)acrylate, isodecyl (meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate and octadecyl(meth)acrylate. These alkyl (meth)acrylate ester are used alone or in combination.

A proportion of the alkyl (meth)acrylate ester is from 60 to 99.5 parts by weight, preferably 80 to 99 parts by weight, and more preferably 80 to 98 parts by weight, based on 100 parts by weight of a total amount of the vinyl monomer mixture.

Examples of the reactive functional group of the reactive functional group-containing vinyl monomer include carboxyl group, epoxy group, hydroxyl group, amide group, amino group, cyano group, imide group, sulfonic acid group, and isocyanate group. Among these groups, a carboxyl group, a hydroxyl group and an amino group are preferable, and a carboxyl group is more preferable.

Specific examples of the reactive functional group-containing vinyl monomer include as carboxyl group-containing vinyl monomers, for example, unsaturated carboxylic acid such as (meth)acrylic acid, fumaric acid, maleic acid, itaconic acid, crotonic acid and cinnamic acid; unsaturated dicarboxylic anhydrides such as fumaric anhydride, maleic anhydride and itaconic anhydride; unsaturated dicarboxylic acid monoesters such as monomethyl itaconate, monobutyl itaconate and 2-acryloyloxyethylphthalic acid; unsaturated tricarboxylic acid monoesters such as 2-methacryloyloxyethyl-trimellitic acid and 2-methacryloyloxyethylpyromellitic acid; and carboxyalkyl acrylates such as carboxyethyl acrylate and carboxypentyl acrylate.

Examples of the reactive functional group-containing vinyl monomer include, in addition to the above-mentioned carboxyl group-containing vinyl monomers, epoxy group-containing vinyl monomers (glycidyl group-containing unsaturated monomers) such as glycidyl(meth)acrylate and methyl glycidyl(meth)acrylate; hydroxyl group-containing vinyl monomers (hydroxyl group-containing vinyl monomers) such as 2-hydroxyethyl acrylate, 2-hydroxypropyl acrylate, 2-hydroxybutyl acrylate; ethylene glycol(meth)acrylate, propylene glycol(meth)acrylate, amide group-containing vinyl monomers (amide group-containing unsaturated monomers) such as (meth)acrylamide, N,N-dimethyl(meth)acrylamide, N,N-diethyl(meth)acrylamide, N-isopropyl(meth)acrylamide, N-butyl(meth)acrylamide, N-methoxymethyl(meth)acrylamide, N-methylol(meth)acrylamide, N-methylolpropane(meth)acrylamide and N-vinylcarboxylic acid amide; amino group-containing vinyl monomers (amino group-containing unsaturated monomers) such as dimethylaminoethyl(meth)acrylate and t-butylaminoethyl (meth)acrylate; cyano group-containing vinyl monomers (cyano group-containing unsaturated monomers) such as acrylonitrile and methacrylonitrile; maleimide-based imide group-containing vinyl monomers (maleimide-based monomers) such as N-cyclhexylmaleimide, N-isopropylmaleimide, N-laurylmaleimide and N-phenylmaleimide; itaconimide-based imide group-containing vinyl monomers (itaconimide-based monomers) such as N-methylitaconimide, N-ethylitaconimide, N-butylitaconimide, N-octylitaconimide, N-2-ethylhexylitaconimide, N-cyclohexylitaconimide and N-laurylitaconimide; succinimide-based imide group-containing vinyl monomers (succinimide-based monomers) such as N-(meth)acryloyloxymethylenesuccinimide, N-(meth)acryloyl-6-oxyhexamethylenesuccinimide and N-(meth)acryloyl-8-oxyoctamethylenesuccinimide; sulfonic acid group-containing vinyl monomers (sulfonic acid group-containing unsaturated monomers) such as styrenesulfonic acid, allylsulfonic acid, 2-(meth)acrylamide-2-methylpropanesulfonic acid, (meth)acrylamidepropanesulfonic acid, sulfopropyl(meth)acrylate and (meth)acryloyloxynaphthalenesulfonic acid; and isocyanate group-containing vinyl monomers (isocyanate group-containing unsaturated monomers) such as 2-methacryloyloxyethyl isocyanate.

Among these reactive functional group-containing vinyl monomers, carboxyl group-containing vinyl monomers, hydroxyl group-containing vinyl monomers and amino group-containing vinyl monomers are preferable, and carboxyl group-containing vinyl monomers are more preferable.

A proportion of the reactive functional group-containing vinyl monomer is from 0.5 to 15 parts by weight, preferably from 0.5 to 10 parts by weight, and more preferably from 1 to 10 parts by weight, based on 100 parts by weight of a total amount of the vinyl monomer mixture.

Examples of the copolymerizable vinyl monomer include, for example, vinyl esters (vinyl carboxylates) such as vinyl acetate and vinyl propionate; olefinic monomers such as ethylene, propylene, isoprene, butadiene and isobutylene; (meth)acrylic acid alicyclic hydrocarbon esters such as cyclohexyl(meth)acrylate, cyclopentyl(meth)acrylate, bornyl (meth)acrylate and isobornyl(meth)acrylate; aryl(meth)acrylate esters such as phenyl(meth)acrylate; aromatic vinyl monomers such as styrene and vinyltoluene; nitrogen atom-containing vinyl monomers such as (meth)acryloyl morpholine, aminoethyl(meth)acrylate, N,N-dimethylaminoethyl (meth)acrylate and t-butylaminoethyl(meth)acrylate; alkoxy group-containing vinyl monomers (alkoxy group-containing unsaturated monomers) such as methoxyethyl(meth)acrylate, ethoxyethyl(meth)acrylate, methoxyethylene glycol (meth)acrylate and methoxypropylene glycol (meth)acrylate; vinyl ether-based monomers such as vinyl ether; halogen atom-containing monomers (halogen atom-containing unsaturated monomers) such as vinyl chloride; vinyl group-containing heterocyclic compounds such as N-vinyl pyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine and tetrahydrofurfuryl (meth)acrylate; and acrylate ester-based monomers having a halogen atom.

Examples of the copolymerizable vinyl monomer include polyfunctional monomer.

Examples of the polyfunctional monomer include (mono or poly)alkylenepolyol poly(meth)acrylates such as ethylene glycol di(meth)acrylate, diethylene glycol di(meth)acrylate, triethylene glycol di(meth)acrylate, trimethylolpropane tri(meth)acrylate, tetraethylene glycol di(meth)acrylate, neopentyl glycol di(meth)acrylate, 1,6-hexanediol di(meth)acrylate, pentaerythritol di(meth)acrylate, tetramethylolmethane tri(meth)acrylate and dipentaerythritol hexa(meth)acrylate; and divinylbenzene. Examples of the polyfunctional monomer include epoxy acrylate, polyester acrylate and urethane acrylate.

Examples of the copolymerizable vinyl monomer include alkoxysilyl group-containing vinyl monomer.

Examples of the alkoxysilyl group-containing vinyl monomer include silicone-based (meth)acrylate monomer and silicone-based vinyl monomer.

Examples of the silicone-based (meth)acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, 3-(meth)acryloyloxypropyl-tributoxysilane, 10-

(meth)acryloyloxydecyl-trimethoxysilane and 10-(meth)acryloyloxydecyl-triethoxysilane; (meth)acryloyloxyalkylalkyldialkoxysilanes such as (meth)acryloyloxymethylmethyldimethoxysilane, (meth)acryloyloxymethylmethyldiethoxysilane, 2-(meth)acryloyloxyetbyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane and 3-(meth)acryloyloxypropyl-propyldiethoxysilane; and (meth)acryloyloxyalkylsilane derivatives corresponding to them, such as (meth)acryloyloxyalkyl-dialkyl(mono)alkoxysilane.

Examples of the silicone-based vinyl monomer include, in addition to vinyltrialkoxysilanes such as vinyltrimethoxysilane, vinyltriethoxysilane, vinyltripropoxysilane, vinyltriisopropoxysilane and vinyltributoxysilane, vinylalkyldialkoxysilanes and vinyldialkylalkoxysilane corresponding to them; vinylalkyltrialkoxysilane such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, γ-vinylpropyltributoxysilane, 4-vinylbutyltrimethoxysilane, 4-vinylbutyltriethoxysilane, 8-vinyloctyltrimethoxysilane and 8-vinyloctyltriethoxysilane; and (vinylalkyl)alkyldialkoxysilane and (vinylalkyl)dialkyl(mono)alkoxysilane corresponding to them.

These copolymerizable vinyl monomers are used alone or in combination.

Among these copolymerizable vinyl monomers, an alkoxysilyl group-containing vinyl monomer is preferable. By using the alkoxysilyl group-containing vinyl monomer as the copolymerizable vinyl monomer, alkoxysilyl groups are introduced in the copolymer and a crosslinked structure can be formed by the reaction between them. In the water dispersible acrylic adhesive, an non-uniform crosslinked structure is formed in case of using the following described crosslinking agent. However, when the alkoxysilyl group-containing monomer is used, a uniform crosslinked structure can be formed.

A proportion of the copolymerizable vinyl monomer is, for example, 39.5 parts by weight or less, preferably 19 parts by weight or less, and more preferably 18 parts by weight or less, based on 100 parts by weight of the total amount of the vinyl monomer mixture.

When an alkoxysilyl group-containing vinyl monomer is used as the copolymerizable vinyl monomer, a proportion thereof is, for example, from 0.001 to 1 part by weight, and preferably from 0.01 to 0.1 part by weight, based on 100 parts by weight of the total amount of the vinyl monomer mixture.

The acrylic adhesive can be obtained by polymerizing the vinyl monomer mixture.

The above-mentioned vinyl monomer mixture is polymerized using a known polymerization method such as emulsion polymerization.

In the emulsion polymerization, the above-mentioned vinyl monomer mixture, emulsifiers, polymerization initiators and, if necessary, chain transfer agents are appropriately mixed in water and then copolymerized. More specifically, known emulsion polymerization methods such as collective charging method (collective polymerization method), monomer dropping method and monomer emulsion dropping method can be employed alone or in combination. In the monomer dropping method and the monomer emulsion dropping method, continuous dropping or divisional dropping is appropriately selected. Reaction conditions are appropriately selected depending on such as a type of a polymerization initiater, but a polymerization temperature is, for example, from 20 to 90° C.

The emulsifier is not specifically limited and a known emulsifier, which is usually used in the emulsion polymerization, is used. Examples thereof include anionic emulsifiers such as sodium lauryl sulfate, ammonium lauryl sulfate, sodium dodecylbenzenesulfonate, polyoxyethylene sodium lauryl sulfate, sodium polyoxyethylene alkyl ether sulfate, ammonium polyoxyethylene alkyl phenyl ether sulfate, sodium polyoxyethylene alkyl phenyl ether sulfate and sodium polyoxyethylene alkyl sulfosuccinate; and nonionic emulsifiers such as polyoxyethylene alkyl ether, polyoxyethylene alkyl phenyl ether, polyoxyethylene fatty acid ester and polyoxyethylene polyoxypropylene block polymer.

The emulsifier further includes radical polymerizable (reactive) emulsifiers (for example, HS-10 (manufactured by Dai-Ichi Kogyo Seiyaku Co., Ltd.) in which a radical polymerizable functional group (radical reactive group) such as propenyl group or allyl ether group is introduced into the anionic emulsifier and the nonionic emulsifier.

These emulsifiers are used alone or in combination.

A proportion of the emulsifier is, for example, from 0.2 to 10 parts by weight, and preferably from about 0.5 to 5 parts by weight, based on 100 parts by weight of the total amount of the vinyl monomer mixture.

The polymerization initiator is not specifically limited and a polymerization initiator, which is usually used in the emulsion polymerization, is used. Examples thereof include azo-based initiators such as 2,2'-azobisisobutyronitrile, 2,2'-azobis(2-methylpropioneamidine)disulfate, 2,2'-azobis(2-methylpropioneamidine)dihydrochloride, 2,2'-azobis(2-amidinopropane)dihydrochloride, 2,2'-azobis[N-(2-carboxyethyl)-2-methylpropioneamidine]hydrate, 2,2'-azobis(N,N'-dimethyleneisobutylamidine), 2,2'-azobis(N,N'-dimethyleneisobutylamidine)dihydrochloride and 2,2'-azobis[2-(2-imidazolin-2-yl)propane]dihydrochloride); persulfate-based initiators such as potassium persulfate and ammonium persulfate; peroxide-based initiators such as benzoyl peroxide, t-butyl hydroperoxide and hydrogen peroxide; substituted ethane-based initiators such as phenyl-substituted ethane; carbonyl-based initiator such as aromatic carbonyl compound; and redox-based initiator (combination of peroxide and reducing agent) such as combination of persulfate and sodium hydrogen sulfite and combination of peroxide and sodium ascorbate.

These polymerization initiators may be water soluble or oil soluble and are used alone or in combination.

An amount of the polymerization initiator is, for example, from 0.005 to 1 part by weight based on 100 parts by weight of the total amount of the vinyl monomer mixture.

A dissolved oxygen concentration in the monomer solution may be decreased by replacing the atmosphere with nitrogen before or while mixing the polymerization initiator with the above-mentioned vinyl monomer mixture.

If necessary, the chain transfer agent is used to adjust a molecular weight of the water dispersible adhesive and a chain transfer agent, which is usually used in the emulsion polymerization, is used. Examples thereof include mercaptans such as 1-dodecanethiol, mercaptoacetic acid, 2-mercaptoethanol, 2-ethylhexyl thioglycolate and 2,3-dimethylcapto-1-propanol.

These chain transfer agents are used alone or in combination.

A proportion of the chain transfer agent is from 0.001 to 0.5 part by weight based on 100 parts by weight of the total amount of the vinyl monomer mixture.

The acrylic adhesive resulted from the above-mentioned emulsion polymerization can be prepared as the water dispersible adhesive, that is, an emulsion (water dispersion).

A solid content concentration of the acrylic adhesive thus prepared is, for example, from 10 to 80% by weight, and preferably from 20 to 60% by weight.

The acrylic adhesive can also be prepared as a water dispersible acrylic adhesive, that is, an emulsion (water dispersion) by the above-mentioned emulsifier according to need polymerizing the above-mentioned vinyl monomer mixture through a method of using no organic solvent other than the emulsion polymerization method (for example, suspension polymerization).

An average particle size of emulsion particles of the acrylic adhesive is, for example, from 0.05 to 10 μm, and preferably from about 0.1 to 1 μm.

The water dispersible adhesive may be mixed with a crosslinking agent according to the purposes and applications. Examples of the crosslinking agent include isocyanate-based crosslinking agent, epoxy-based crosslinking agent, oxazoline-based crosslinking agent, aziridine-based crosslinking agent and metal chelate-based crosslinking agent. These crosslinking agents are not specifically limited and may be oil soluble or water soluble. These crosslinking agents are used alone or in combination. A proportion thereof is, for example, from 0.1 to 10 parts by weight based on 100 parts by weight of the solid content of the acrylic adhesive.

For the purpose of improving stability of the emulsion, a pH of the acrylic adhesive is adjusted from 7 to 9, and preferably from 7 to 8, by ammonia water or the like.

Furthermore, additives, which are usually added to an acrylic adhesive, such as viscosity modifiers and, if necessary, release modifiers, plasticizers, softeners, fillers, colorant (for example, pigments, dyes), antioxidant and surfactant may be appropriately added to the adhesive. A proportion of these additives is not specifically limited and can be appropriately selected.

The viscosity modifier is not specifically limited and examples thereof include acrylic thickener.

A gel fraction of the solid content of the water dispersible adhesive is, for example, from 50 to 100% by weight, and preferably from 70 to 100% by weight. When the gel fraction is less than the above range, foaming and peeling may occur in case the water dispersible adhesive is applied to the adhesive optical film and the resulting product is used in a high-temperature and high-humidity atmosphere.

The gel fraction can be calculated by the following equation after the water dispersible adhesive is coated with a Teflon film and immersed in ethyl acetate for 7 days.

Gel fraction (% by weight)=(weight of water dispersible adhesive composition adhering to Teflon film after immersing/weight of water dispersible adhesive composition before immersing)×100

In the adhesive film according to the first embodiment of the present invention, the under coat layer contains an organometallic compound.

The organometallic compound is, for example, a metal alkoxide, a metal chelate, an organometallic salt or an organometallic oxide which are used as a polymer crosslinking agent and examples thereof include organozirconium compound, organotitanium compound and organoaluminum compound according to the kind of metal.

Examples of the organozirconium compound include zirconium alkoxide, zirconium chelate and zirconium acylate.

Examples of the organotitanium compound include titanium alkoxide, titanium chelate and titanium acylate.

Examples of the organoaluminum compound include aluminum alkoxide, aluminum chelate and aluminum acylate.

These organometallic compounds are usually prepared by dissolving or dispersing in an organic solvent or water so as to adjust a proportion of the metal within a range from 0.1 to 20% by weight, and preferably from 1 to 15% by weight.

In the adhesive film according to the first embodiment of the present invention, the under coat layer preferably contains a resin.

The resin is not specifically limited and examples thereof include polyacryl resin, polyurethane resin and polyester resin, and resins obtained by modifying these resins with a reactive functional group are preferable.

Examples of the reactive functional group include carboxyl group, hydroxyl group, oxazoline group and amino group, of which an oxazoline group and an amino group are preferable.

Examples of the oxazoline group include 2-oxazoline group, 3-oxazoline group and 4-oxazoline group, of which a 2-oxazoline group is preferable.

The 2-oxazoline group is generally represented by the following general formula (5):

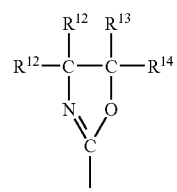

(5)

in the general formula (5), $R^{11}$, $R^{12}$, $R^{13}$ and $R^{14}$ each independently represents a hydrogen atom, a halogen atom, an alkyl group, an aralkyl group, a phenyl group or a substituted phenyl group.

Examples of the amino group include primary amino group and secondary amino group.

When the reactive functional group is an oxazoline group, examples of the resin modified with the reactive functional group, more specifically, includes an oxazoline group-containing acrylic polymer in which a principal chain composed of an acryl or styrene skeleton is contained and an oxazoline group is present in a side chain of the principal chain, preferably an oxazoline group-containing acrylic polymer in which a principal chain composed of an acryl skeleton is contained and an oxazoline group is present in a side chain of the principal chain. When the reactive functional group is an amino group, the resin modified with the reactive functional group includes polyethyleneimine; polyallylamine; and ethyleneimine-modified acrylic resin and allylamine-modified acrylic resin in which a principal chain composed of an acryl skeleton is contained and a polyethyleneimine chain represented by the following general formula (6) or a polyallylamine chain represented by the following general formula (7) is modified in a side chain of the principal chain.

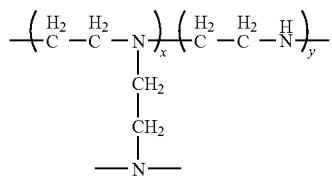

(6)

In the general formula (6), x and y represent the polymerization degree of a polyethyleneimine chain.

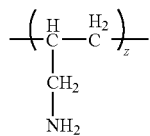

(7)

In the general formula (7), z represents the polymerization degree of a polyallylamine chain.

These resins are usually prepared by dissolving or dispersing in an organic solvent or water so as to adjust a proportion of the solid content within a range from 0.01 to 15% by weight, and preferably from 0.05 to 5% by weight.

These resins are used alone or in combination.

When the undercoat layer contains an organometallic compound, adhesion between a base material and an adhesive layer can be enhanced. Since such a reactive functional group reacts with the organometallic compound, the resins of the undercoat layer are crosslinked with each other and a tough undercoat layer can be formed. Furthermore, the resin of the undercoat layer and the acrylic adhesive of the adhesive layer are crosslinked and adhesion between a base material and an adhesive layer can be enhanced.

In the adhesive film according to the first embodiment of the present invention, the base material is not specifically limited and a base material used in the adhesive film is usually used. Examples thereof include polyester films such as polyethylene terephthalate (PET) film; polyolefin films such as polyethylene film and polypropylene film; plastic films such as polyvinyl chloride and polystyrene; papers such as craft paper; clothes such as cotton cloth and staple fiber cloth; nonwoven fabrics such as polyester nonwoven fabric and vinylon nonwoven fabric; and metal foil.

In the base material, the side, on which the under coat layer is formed, may be subjected to an activation treatment such as corona treatment, UV treatment or plasma treatment.

When an adhesive film is used as the base material for the purpose of protecting the surface of an optical material, an optical film having optical characteristics is preferred.

The optical film is not specifically limited as far as it is a firm having optical characteristics, and examples thereof include polarizing film, phase difference film, luminance improving film and view-angle expansion film.

A polarizing film to be used comprises a polarizer and a transparent protective film formed on one or both sides of the polarizer.

The polarizer is not specifically limited, and examples thereof include those obtained by dyeing hydrophilic polymer films such as polyvinyl alcohol-based film, partially formalated polyvinyl alcohol-based film and ethylene-vinyl acetate copolymer-based partially saponified film with a dichroic substance such as iodine or dichloric dye, followed by monoaxial stretching; and polyene-based oriented films subjected to a dehydration treatment of polyvinyl alcohol or a dehydrochlorination treatment of polyvinyl chloride. A polarizer obtained by dyeing a polyvinyl alcohol-based film with iodine, followed by monoaxial stretching, is preferable.

Examples of the transparent protective film include polyester-based polymer film such as polyethylene terephthalate or polyethylene naphthalate, cellulose-based polymer film such as diacetyl cellulose or triacetyl cellulose, acrylic-based polymer film such as polymethyl methacrylate, styrene-based polymer film such as polystyrene or acrylonitrile-styrene copolymer (AS resin), and polycarbonate-based polymer film. The transparent protective film further includes polyolefin-based polymer film such as polyethylene, polypropylene, polyolefin having a cyclo or norbornene structure or ethylene-propylene copolymer, vinyl chloride-based polymer film, nylon, amide-based polymer film such as aromatic polyamide, imide-based polymer film, sulfone-based polymer film, polyethersulfone-based polymer film, polyether ether ketone-based polymer film, polyphenylene sulfide-based polymer film, vinyl alcohol-based polymer film, vinylidene chloride-based polymer film, vinyl butyral-based polymer film, allylate-based polymer film, polyoxymethylene-based polymer film, epoxy-based polymer film, or films such as a blend of the above polymers.

The transparent protective film can be formed as a cured layer made of an acrylic-based, urethane-based, acryl-urethane-based, epoxy-based or silicone-based thermosetting or ultraviolet curable resin.

The transparent protective film is preferably made of a cellulose-based polymer. The thickness of the transparent protective film is not specifically limited and is 500 μm or less, preferably from 1 to 300 μm, and more preferably from 5 to 200 μm.

The polarizer is bonded with the transparent protective film using an isocyanate-based adhesive, a polyvinyl alcohol-based adhesive, a gelatin-based adhesive, a vinyl-based adhesive, a latex-based adhesive or water-based polyester adhesive.

Examples of the phase difference film include double refraction film obtained by monoaxially or diaxially stretching a polymer material, oriented film of a liquid crystal polymer, and film comprising an oriented layer made of a liquid crystal polymer supported thereon. The thickness of the phase difference film is not specifically limited and is, for example, from 20 to 150 μm.

Examples of the polymer material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyether sulfone, polyphenylene sulfide, polyphenylene oxide, polyallyl sulfone, polyvinyl alcohol, polyamide, polyimide, polyolefin, polyvinyl chloride, cellulose-based polymer, or various two-dimensional or three-dimensional copolymers thereof, graft copolymer, and blends. These polymer materials are formed into an oriented substance (stretched film) by stretching.

Examples of the liquid crystal polymer include various principal chain or side chain type liquid crystal polymers in which a conjugated linear atomic group (mesogen) capable of imparting liquid crystal orientation is introduced into the principal chain or side chain of the polymer. The principal chain type liquid crystal polymer has a structure in which a mesogen group is attached at the spacer moiety capable of imparting flexibility, and specific examples thereof include nematically oriented polyester-based liquid crystal polymer, discotic polymer and cholesteric polymer. Examples of the side chain type liquid crystal polymer include those which contain polysiloxane, polyacrylate, polymethacrylate or polymalonate as a principal chain skeleton and also has, as a side chain, a mesogen moiety composed of a para-substituted cyclic compound unit capable of imparting nematic orientation via a spacer moiety composed of a conjugated atomic group. These liquid crystal polymers are obtained by spreading a solution of a liquid crystal polymer over an oriented surface such as the surface of a thin film made of polyimide or polyvinyl alcohol formed on a glass plate subjected to a rubbing treatment, or to an oblique deposition with silicon oxide, followed by a heat treatment.

The phase difference film may be one used for the purpose of coloring or films having various wavelengths and a liquid crystal layer due to double refraction or enlarging a view angle, or may appropriately have phase difference according to the purposes, or optical characteristics such as phase difference may be controlled by laminating two or more phase difference films.

Examples of the luminance improving film include those which allow permeation of linear polarization of a predetermined polarizing axis and reflect other light, such as multilayered thin film of dielectrics or multilayered laminate composed of thin films each having different refractive index anisotropy; and those which allow permeation of either left-hand or right-hand circularly polarized light and reflects the other light, such as oriented film of a cholesteric liquid crystal polymer or a film comprising film base material and an oriented liquid crystal layer supported on the base material.

The view-angle expansion film is a film used to enlarge a view angle so that images can be seen comparatively clearly when viewed the image plane of the liquid crystal display from a slightly diagonal direction relative to the image plane, not from a perpendicular direction to the image plane, and examples thereof include phase difference film, oriented film made of liquid crystal polymer, and film comprising a transparent base material supported by an oriented layer such as a liquid crystal polymer. Examples of the phase difference film used as the view-angle expansion film include polymer film having double refraction obtained by biaxially stretched in the plane direction; polymer film having double refraction, in which refractive index in the thickness direction is controlled, obtained by monoaxially stretching in the plane direction and also under stretch in the thickness direction, and biaxially stretched film such as inclined oriented film.

An embodiment of a method for producing an adhesive film according to the first embodiment of the present invention will now be described with reference to FIG. 1.

First, a base material 1 is prepared so as to obtain an adhesive film according to the first embodiment shown in FIG. 1.

A thickness of the base material 1 is, for example, from 10 to 1000 μm, and preferably from 50 to 500 μm.

Then, an under coat layer 2 is laminated on one side of the base material 1.

The under coat layer 2 is formed, for example, by a method of directly coating an undercoating solution (solution or dispersion) containing the above-mentioned metal compound and, if necessary, a resin on the base material 1 using a known coating method such as coating method, dipping method or spray method, followed by drying.

The thickness of the under coat layer 2 is, for example, set so that the thickness before drying is from 1 to 500 μm, preferably from 10 to 100 μm, and more preferably from 20 to 50 μm, and the thickness after drying is from 1 to 1000 nm, preferably from 10 to 500 nm, and more preferably from 20 to 400 nm. When the thickness is within the above range, it is possible to effectively prevent the adhesive film and the adherend from being charged.

Then, an adhesive layer 3 is formed on the one side of the base material 1 via the under coat layer 2.

The adhesive layer 3 is formed, for example, by a method of transferring the adhesive layer 3 to the above under coat layer 2 from a release film on which the adhesive layer 3 is formed.

Examples of the release film include paper; synthetic resin film made of polyethylene, polypropylene or polyethylene terephthalate; rubber film; fabric; nonwoven fabric; net; foamed film; metal foil; and laminated film material (laminated film) thereof. If necessary, a surface of the release film may be subjected to a treatment such as silicone treatment, long chain alkyl treatment or fluorine treatment so as to enhance releasability from the adhesive layer 3.

The release film on which the adhesive layer 3 is formed can be formed by directly coating an acrylic adhesive on the release film using a coater such as roll coater, gravure coater, bar coater, knife coater, comma coater or die coater, followed by drying to form the adhesive film 3. The adhesive film 3 is transferred by attaching the release film on which the adhesive layer is formed with the base material 1 on which the under coat layer 2 is formed so as to contact the under coat layer 2 with the adhesive layer 3, and removing the release film from the adhesive layer 3.

The adhesive layer 3 can also be formed, for example, by directly coating an acrylic adhesive on the above under coat layer 2 using a coater such as roll coater, gravure coater, bar coater, knife coater, comma coater or die coater, followed by drying.

A thickness (thickness after drying) of the adhesive layer 3 is set within a range, for example, from 1 to 100 μm, preferably from 5 to 50 μm, and more preferably from 10 to 40 μm.

As described above, there can be obtained an adhesive film according to the first embodiment, comprising a base material 1, an adhesive layer 3 laminated on one side of the base material 1; and an under coat layer 2 which is interposed between the base material 1 and the adhesive layer 3.

The adhesive film according to the first embodiment of the present invention thus obtained comprises the under coat layer 2 which is interposed between the base material 1 and the adhesive layer 3 and contains an organometallic compound and is therefore less likely to be charged and also can improve adhesion between the base material 1 and the adhesive layer 3. Therefore, the adhesive film can effectively prevent static charge on peeling generated when removed from an adherend and can be used as an adhesive film having high adhesion between the base material 1 and the adhesive layer 3 in various industrial fields such as electrics and electronics, semiconductors and optics.

The adhesive film according to the first embodiment is used as, in addition to the above-mentioned adhesive film, an adhesive sheet and an adhesive tape. This adhesive film is preferably used as the base material 1 in an adhesive optical film comprising an optical film.

In the above description, the under coat layer 2 and the adhesive layer 3 are formed on the one side of the base material 1 and may be formed on both sides of the base material 1.

An adhesive film according to the second embodiment of the present invention comprises a base material, an adhesive layer laminated on at least one side of the base material, and an antistatic layer interposed between the base material and the adhesive layer.

In the adhesive film according to the second embodiment of the present invention, the adhesive layer is made of an adhesive composition and this adhesive composition is a water dispersible adhesive composition comprising, as raw monomers, an alkyl (meth)acrylate ester whose alkyl group has 4 to 18 carbon atoms, a carboxyl group-containing vinyl monomer and a phosphoric acid group-containing vinyl monomer represented by the following general formula (1), and also optional comprising, as raw monomers, a copolymerizable vinyl monomer which is copolymerizable with the above monomers, wherein with respect to a proportion of the raw monomers, an amount of the alkyl(meth)acrylate ester is from 60 to 99 parts by weight based on 100 parts by weight of the total amount of the raw monomers, and a total proportion of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomer,

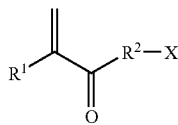

(1)

in the general formula (1), $R^1$ represents a hydrogen atom or a methyl group, $R^2$ represents a polyoxyalkylene group, and X represents a phosphoric acid group or a salt thereof.

Examples of the alkyl(meth)acrylate ester whose alkyl group has 4 to 18 carbon atoms include the same alkyl methacrylate as that which is a principal component of an acrylic adhesive used in the adhesive layer of the adhesive film according to the first embodiment, and these alkyl(meth)acrylate esters are appropriately used alone or in combination.

A proportion of the alkyl(meth)acrylate ester is, for example, from 60 to 99 parts by weight, and preferably from 70 to 99 parts by weight, based on 100 parts by weight of the entire raw monomers.

The carboxyl group-containing vinyl monomer may be a vinyl monomer having a carboxyl group in a molecule thereof, and examples thereof include the same carboxyl group-containing vinyl monomer as that of the reactive functional group-containing vinyl monomer as the component other than the alkyl(meth)acrylate ester of the acrylic adhesive used in the adhesive layer of the adhesive film according to the first embodiment, and also include, for example, carboxyalkyl acrylates such as β-carboxyethyl acrylate and ω-carboxy-polycaprolactone monoacrylate. These carboxyl group-containing vinyl monomers are appropriately used alone or in combination.

A carboxyl group concentration of the carboxyl group-containing vinyl monomer in the raw monomers is, for example, from 0.05 to 1.50 mmol/g, and preferably from 0.20 to 0.90 mmol/g. To adjust the carboxyl group concentration of the carboxyl group-containing vinyl monomer within the above range, the proportion of the carboxyl group-containing vinyl monomer is set, for example, from 0.4 to 41 parts by weight, and preferably from 1.4 to 25 parts by weight, based on 100 parts by weight of the total amount of the raw monomers, although it varies depending on a molecular weight of the carboxyl group-containing vinyl monomer. When the proportion is less than the above range, the cohesive force of the water dispersible adhesive composition decreases. On the other hand, when the proportion is more than the above range, stability upon emulsion polymerization and water resistance of the water dispersible adhesive composition deteriorate.

The carboxyl group concentration of the carboxyl group-containing vinyl monomer is calculated by the following equation.

Carboxyl group concentration [mmol/g]=1000×{(mixture weight [g] of carboxyl group-containing vinyl monomer)/(molecular weight [g/mol] of carboxyl group-containing vinyl monomer)}/(total weight [g] of raw monomers).

In the above equation, the total weight of the raw monomers is the weight which does not include water, and additives such as initiators, emulsifiers, chain transfer agents, crosslinking agents and viscosity modifiers described below.

The phosphoric acid group-containing vinyl monomer represented by the following general formula (1) is a polyalkylene oxide (meth)acrylate phosphate ester,

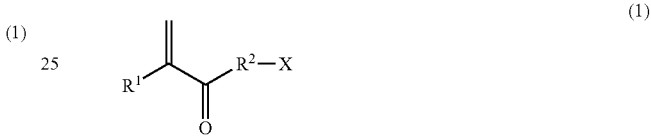

(1)

in the general formula (1), $R^1$ represents a hydrogen atom or a methyl group, $R^2$ represents a polyoxyalkylene group, and X represents a phosphoric acid group or a salt thereof.

The polyoxyalkylene group represented by $R^2$ is represented by the following general formula (2):

(2)

in the general formula (2), n represents an integer of 1 to 4, and m represents an integer of 2 or more.

Examples of the polyoxyalkylene group include polyoxyethylene group (in the general formula (2), n=2), polyoxypropylene group (in the general formula (2), n=3) and a random, block or graft unit thereof. A polymerization degree of these oxyalkylene groups, namely m in the general formula (2), is preferably 4 or more, and usually 40 or less.

When the polymerization degree of the oxyalkylene group is higher, mobility of a side chain of the phosphoric acid group increases, and interaction with glass rapidly proceeds, and thus adhesion of the water dispersible adhesive composition to a glass substrate is improved.

The phosphoric acid group or a salt thereof represented by X is represented by the following general formula (3):

(3)

in the general formula (3), $M^1$ and $M^2$ each independently represents a hydrogen atom or a cation.

The cation is not specifically limited and examples thereof include inorganic cations of alkaline metals such as sodium and potassium, and alkaline earth metals such as calcium and magnesium; and organic cations of quaternary amines.

As the phosphoric acid group-containing vinyl monomer, commercially available products can be used, and examples thereof include mono[poly(ethylene oxide)methacrrylate] phosphate esters such as Sipomer PAM-100 (manufactured by Rhodia Nicca, Ltd.), Phosmer PE (manufactured by Uni-Chemical Co., Ltd.), Phosmer PEH (manufactured by Uni-Chemical Co., Ltd.) and Phosmer PEDM (manufactured by Uni-Chemical Co., Ltd.); and mono[poly(propylene oxide)methacrylate]phosphate esters such as Sipomer PAM-200 (manufactured by Rhodia Nicca, Ltd.), Phosmer PP (manufactured by Uni-Chemical Co., Ltd.), Phosmer PPH (manufactured by Uni-Chemical Co., Ltd.) and Phosmer PPDM (manufactured by Uni-Chemical Co., Ltd.).

These phosphoric acid group-containing vinyl monomers are appropriately used alone or in combination.

A phosphoric acid group concentration of the phosphoric acid group-containing vinyl monomer in the raw monomers is, for example, from 0.01 to 0.45 mmol/g, and preferably from 0.02 to 0.20 mmol/g. To adjust the phosphoric acid group concentration of the phosphoric acid group-containing vinyl monomer within the above range, a proportion of the phosphoric acid group-containing vinyl monomer is set from 0.4 to 22 parts by weight, and preferably from 0.8 to 10 parts by weight, based on 100 parts by weight of the total amount of the raw monomers, although it varies depending on a molecular weight of the phosphoric acid group-containing vinyl monomer. When the proportion is less than the above range, sufficient effect of improving adhesion to the glass substrate is not achieved. On the other hand, when the proportion is more than the above range, stability in emulsion polymerization may deteriorate and adhesion may deteriorate due to increased elastic modulus of the water dispersible adhesive composition.

The phosphoric acid group concentration of the phosphoric acid group-containing vinyl monomer is calculated by the following equation.

Phosphoric acid group concentration [mmol/g]=1000× {(mixture weight [g] of phosphoric acid group-containing vinyl monomer)/(molecular weight [g/mol] of phosphoric acid group-containing vinyl monomer)}/(total weight [g] of raw monomers)

In the above equation, the total weight of the raw monomers is the weight which does not include water and additives such as initiators, emulsifiers, chain transfer agents and crosslinking agents and viscosity modifiers.

Examples of the copolymerizable vinyl monomer copolymerizable with the above-mentioned monomers include functional group-containing vinyl monomers other than carboxylic acid.

Examples of the functional group-containing vinyl monomer include the same reactive functional group-containing vinyl monomer other than the carboxyl group-containing vinyl monomer as that which is the component other than the alkyl (meth)acrylate ester of the acrylic adhesive used in the adhesive layer of the adhesive film according to the first embodiment, and also include a glycol-based acryl ester monomer such as polyethylene glycol(meth)acrylate, polypropylene glycol(meth)acrylate or methoxypolypropylene glycol(meth)acrylate.

Examples of the functional group-containing vinyl monomer further include a polyfunctional monomer.

Examples of the polyfunctional monomer include the same polyfunctional monomer as that of a copolymerizable vinyl monomer which is the component other than the alkyl(meth)acrylate ester of the acrylic adhesive used in the adhesive layer of the adhesive film according to the first embodiment, and also include (mono or poly)alkylene glycol di(meth)acrylate including (mono or poly)ethylene glycol di(meth)acrylate or (mono or poly)propylene glycol di(meth)acrylate such as propylene glycol di(meth)acrylate, and pentaerythritol tri(meth)acrylate.

Examples of the copolymerizable vinyl monomer include the same copolymerizable vinyl monomer as that which is the component other than the alkyl(meth)acrylate ester of the acrylic adhesive used in the adhesive layer of the adhesive film according to the first embodiment.

Examples of the copolymerizable vinyl monomer further include an alkoxysilyl group-containing vinyl monomer. Examples of the alkoxysilyl group-containing vinyl monomer include a silicone-based (meth)acrylate monomer and a silicone-based vinyl monomer.

Examples of the silicone-based (meth)acrylate monomer and the silicone-based vinyl monomer include the same silicone-based (meth)acrylate monomer and silicone-based vinyl monomer as those which are copolymerizable monomers as the component other than the alkyl(meth)acrylate ester of the acrylic adhesive used in the adhesive layer of the adhesive film according to the first embodiment.

These copolymerizable vinyl monomers are appropriately used alone or in combination.

Among these copolymerizable vinyl monomers, an alkoxysilyl group-containing vinyl monomer is preferable.

By using the alkoxysilyl group-containing vinyl monomer as the copolymerizable vinyl monomer, an alkoxysilyl group is introduced into a polymer chain and a crosslinked structure can be formed by a reaction between them. Particularly in case of the water dispersible adhesive composition, since a non-uniform crosslinked structure is formed by using a crosslinking agent described hereinafter, terminal peeling of an adhesive optical film is likely to occur. However, when the alkoxysilyl group-containing monomer is used, a uniform crosslinked structure can be formed and thus adhesion and fixation to a glass substrate can be improved. Further, the alkoxysilyl group interacts with a glass substrate, thus making it possible to enhance adhesion to the glass substrate.

If necessary, the copolymerizable vinyl monomer is optionally mixed and its proportion is, for example, 39 parts by weight or less, and preferably 19 parts by weight or less, based on 100 parts by weight of the total amount of the raw monomers. When the copolymerizable vinyl monomer is an alkoxysilyl group-containing vinyl monomer, the proportion is, for example, from 0.001 to 1 part by weight, and preferably from 0.005 to 0.1 part by weight, based on 100 parts by weight of the total amount of the raw monomers. When the proportion of the alkoxysilyl group-containing vinyl monomer is less than the above range, a cohesive force of the adhesive decreases and adhesion between the water dispersible adhesive composition and the glass substrate can not be improved because of poor crosslinking of the alkoxysilyl group. On the other hand, when the proportion is more than the above range, stability in emulsion polymerization and adhesion may deteriorate.

A total amount of the carboxyl group-containing vinyl monomer, the phosphoric acid group-containing vinyl monomer and the copolymerizable vinyl monomer in the raw monomers described above is, for example, from 1 to 40 parts by weight, and preferably from 1 to 30 parts by weight, based on 100 parts by weight of the total amount of the raw monomers.

The water dispersible adhesive composition is prepared by copolymerizing the above raw monomers using a polymerization method such as emulsion polymerization.

In case of emulsion polymerization, the same emulsion polymerization method as described above can be employed.

Reaction conditions are appropriately selected, and the polymerization temperature is, for example, from 20 to 90° C.

Examples of the polymerization initiator include the same polymerization initiator as that used in the emulsion polymerization of the vinyl monomer mixture of the acrylic adhesive which is used in the adhesive layer of the adhesive film according to the first embodiment. These polymerization initiators are appropriately used alone or in combination. Among these polymerization initiators, an azo-based initiator is preferably used.

A proportion of the polymerization initiator is appropriately selected and, for example, is from 0.005 to 1 parts by weight based on 100 parts by weight of the total amount of the raw monomers.

A dissolved oxygen concentration in a monomer solution may be decreased by replacing the atmosphere with nitrogen before or while mixing the polymerization initiator with the raw monomers.

Examples of the emulsifier include the same emulsifier as that used in the emulsion polymerization of the vinyl monomer mixture of the acrylic adhesive which is used in the adhesive layer of the adhesive film according to the first embodiment.

These emulsifiers are appropriately used alone or in combination. A proportion of the emulsifier is, for example, from 0.2 to 10 parts by weight, and preferably from 0.5 to 5 parts by weight, based on 100 parts by weight of the total amount of the raw monomers.

If necessary, the chain transfer agent is used to adjust a molecular weight of the water dispersible adhesive composition and a chain transfer agent, which is usually used in the emulsion polymerization, is used. Examples of the chain transfer agent include the same chain transfer agent as that used in the emulsion polymerization of the vinyl monomer mixture of the acrylic adhesive which is used in the adhesive layer of the adhesive film according to the first embodiment.

These chain transfer agents are appropriately used alone or in combination. A proportion of the chain transfer agent is, for example, from 0.001 to 0.5 part by weight based on 100 parts by weight of the total amount of the raw monomers.

A copolymer resulted from the above-mentioned emulsion polymerization can be prepared as an emulsion (water dispersion) of the water dispersible adhesive composition.

The water dispersible adhesive composition can also be prepared, for example, by polymerizing the raw monomers through a method of using no organic solvent other than the emulsion polymerization method, and dispersing the resulting polymer in water using the above emulsifier.

If necessary, the water dispersible adhesive composition may be mixed with a crosslinking agent according to the purposes and applications. Examples of the crosslinking agent include the same crosslinking agent as that combined in the acrylic adhesive which is used in the adhesive layer of the adhesive film according to the first embodiment. These crosslinking agents are not specifically limited and may be water soluble or oil soluble. These crosslinking agents are appropriately used alone or in combination. The proportion is, for example, from 0.1 to 10 parts by weight based on 100 parts by weight of the total amount of the raw monomers.

For the purpose of improving stability of the emulsion, a pH of the water dispersible adhesive composition is adjusted, for example, from 7 to 9, and preferably from 7 to 8, by ammonia water or the like.

Furthermore, additives, which are usually added to a water dispersible adhesive composition, such as viscosity modifiers and, if necessary, release modifiers, plasticizers, softeners, fillers, colorant (for example, pigments, dyes), antioxidant and surfactant may be appropriately added to the water dispersible adhesive composition. A proportion of these additives is not specifically limited and can be appropriately selected.

The viscosity modifier is not specifically limited and examples thereof include the same viscosity modifier as that added to the acrylic adhesive which is used in the adhesive layer of the adhesive film according to the first embodiment.

A gel fraction of the water dispersible adhesive composition (solid content) thus prepared is as described above and is preferably from 70 to 100% by weight. When the gel fraction is less than the above range, foaming and peeling may occur in case the water dispersible adhesive composition is applied to the adhesive optical film comprising an optical film as a base material (that is, adhesive optical film) and the resulting product is used in a high-temperature and high-humidity atmosphere.

The gel fraction can be calculated by the same equation as that used to calculate the gel fraction of the water dispersible acrylic adhesive which is used in the adhesive layer of the adhesive film according to the first embodiment.

In the adhesive film according to the second embodiment of the present invention, the antistatic layer contains a water soluble or water dispersible conductive material.

The water soluble conductive material is not specifically limited as far as it is a water soluble conductive material, and its solubility in 100 g of water is, for example, 5 g or more, and preferably from 20 to 30 g. When the solubility in 100 g of water is less than 5 g, it may be difficult to form a coating film from an industrial point of view.

The water dispersible conductive material is not specifically limited as far as it is a water dispersible conductive material in the form of fine particles and the average particle diameter (size) of the fine particles is, for example, 1 μm or less in view of uniformity of the antistatic layer. The water dispersible conductive material has poor liquid viscosity of its water dispersion (corresponding to the coating solution described hereinafter) and is easily subjected to a coating (thin film coating) operation for formation of an antistatic layer, and is also excellent in uniformity of the water dispersible conductive material in the antistatic layer.

Examples of the water soluble or water dispersible conductive material include a conductive polymer, an organometallic compound, a metal oxide and a carbon nanomaterial.

Examples of the conductive polymer include polyaniline, polythiophene, polypyrrole and polyquinoxaline. In view of coatability, polyaniline or polythiophene is preferable among these conductive polymers.

A polystyrene equivalent weight average molecular weight of polyaniline measured by GPC is, for example, 500,000 or less, and preferably 300,000 or less. A polystyrene equivalent weight average molecular weight of polythiophene measured by GPC is, for example, 400,000 or less, and preferably 300,000 or less.

When the weight average molecular weight of the polyaniline or polythiophene exceeds the above range, the polyaniline or polythiophene does not exhibit either of water solubility or water dispersibility. Moreover, when a coating solution containing such polyaniline or polythiophene is prepared, a portion of the solid content of the polyaniline or polythiophene is remained in the coating solution, or a portion of the polyaniline or polythiophene has high viscosity. As a result, it tends to become difficult to form an antistatic layer having a uniform thickness.

Such polyaniline or polythiophene preferably has a hydrophilic functional group in the molecule.

Examples of the hydrophilic functional group include sulfo group, amino group, amide group, imino group, quaternary ammonium salt group, hydroxyl group, mercapto group, hydrazino group, carboxyl group, sulfate ester group (—O—$SO_3H$), phosphate ester group (—O—$PO(OH)_2$), or salts thereof (excluding quaternary ammonium salt group). Such a hydrophilic functional group contained in the molecule enables easy dissolution or dispersion in water, and thus it becomes possible to easily prepare a coating solution of the polyaniline or polythiophene.

As such water soluble or water dispersible conductive polymer, commercially available products can be used, and examples of the water soluble conductive polymer include polyanilinesulfonic acid (manufactured by Mitsubishi Rayon Co., Ltd.) and examples of the water dispersible conductive polymer include an polythiophene-based conductive polymer (manufactured by Nagase ChemteX Corporation under the trade name of "Denatron" (Denatron series)).

These conductive polymers are appropriately used alone or in combination.

Furthermore, doping agents, crosslinking agents, radical initiators and crosslinking reaction type compounds can be added to the conductive polymer.

The doping agent functions as a dopant and securely imparts (doping) conductivity to the conductive polymer, and examples thereof include a sulfonic acid-based compound.

The sulfonic acid-based compound is water soluble and examples thereof include p-toluenesulfonic acid, benzenesulfonic acid, ethylbenzenesulfonic acid, octylbenzenesulfonic acid, dodecylbenzenesulfonic acid, mesitylenesulfonic acid, m-xylenesulfonic acid, polystyrenesulfonic acid and polyvinylsulfonic acid. To improve solubility and water dispersibility of the conductive polymer, polystyrenesulfonic acid and polyvinylsulfonic acid are preferably used. These sulfonic acid-based compounds are appropriately used alone or in combination.

It is considered that the conductive polymer partially reacts with the sulfonic acid compound to form a sulfonate by adding such a doping agent and the antistatic function of the antistatic layer is improved by the action of the sulfonate.

A proportion of the doping agent is, for example, from 100 to 300 parts by weight, and preferably from 150 to 250 parts by weight, based on 100 parts by weight of the conductive polymer. When the proportion of the doping agent is less than 100 parts by weight, an amount of the sulfonate produced by the reaction between the conductive polymer and the sulfonic acid-based compound decreases and sufficient antistatic function may not be obtained. On the other hand, when the proportion of the doping agent is more than 300 parts by weight, the antistatic function may not be improved by increasing the amount of the doping agent than that described in the above range.

The crosslinking agent is not specifically limited, and examples thereof include melamine-based crosslinking agent, polycarbodiimide-based crosslinking agent, polyoxazolidine-based crosslinking agent, polyepoxy-based crosslinking agent and polyisocyanate-based crosslinking agent, of which a melamine-based crosslinking agent is preferable. These crosslinking agents are appropriately used alone or in combination.

Since the conductive polymer is cured by crosslinking through the addition of such a crosslinking agent, an antistatic layer having excellent water resistance and durability can be formed.

A proportion of the crosslinking agent is, for example, from 0.001 to 5 parts by weight, and preferably from 0.1 to 1 part by weight, based on 100 parts by weight of the conductive polymer.

The radical initiator is a compound which generates a radical by heat or irradiation with light (for example, ultraviolet rays (UV), electron beam (EB), etc.), and examples thereof include the same polymerization initiator as that used in the emulsion polymerization. Among these, peroxide-based initiators (for example, benzoyl peroxide), sulfate-based initiators (for example, potassium persulfate) and azo-based initiators (for example, 2,2'-azobisisobutyronitrile). These radical initiators are appropriately used alone or in combination.

By adding such a radical initiator, hydrogen atoms of the conductive polymer are extracted by radicals generated and the radicals are generated on the conductive polymer. Then, since these radical react with each other and cured by crosslinking, it is possible to form an antistatic layer which is excellent in water resistance and durability.

A proportion of the radical initiator is, for example, from 0.01 to 5 parts by weight, preferably from 0.02 to 3 parts by weight, and more preferably from 0.05 to 1 part by weight, based on 100 parts by weight of the conductive polymer.

The crosslinking reaction type compound is a binder component and is a water soluble monomer, oligomer or polymer before the crosslinking reaction, and it is converted into a water insoluble compound after the crosslinking reaction because a three-dimensional network is formed. Examples thereof include a two-pack reaction type epoxy resin, a urea resin and a melamine resin.

The two-pack reaction type epoxy resin comprises a main component and a curing agent and, by mixing both of them, a three-dimensional polymer network structure is formed by irreversible crosslinking reaction.

The main component is a water soluble polyfunctional epoxy resin, and examples of such water soluble polyfunctional epoxy resin include aliphatic glycidyl ethers such as triglycidyl isocyanurate, sorbitol polyglycidyl ether, (poly) glycerol polyglycidyl ether, polyethylene glycol diglycidyl ether and (poly)propylene glycol diglycidyl ether; and alicyclic glycidyl ethers such as sorbitan polyglycidyl ether.

The curing agent is a water soluble curing agent, and examples of such water soluble curing agent include aliphatic polyhydric amines such as diethylenetriamine, triethylenetetramine and polyamideamine; imidazoles such as 2-methylimidazole and 2-ethyl-4-methylimidazole; tertiary amines such as benzyldimethylamine; acid anhydrides such as hthalic anhydride and methylhimic anhydride (for example, 3-methyl-1,2,3,6-tetrahydrophthalic anhydride, 4-methyl-1,2,3,6-tetrahydrophthalic anhydride, etc.); and Lewis acids such as boron trifluoride.

The urea resin is obtained by a dehydration condensation reaction of an initial prepolymer (monomethylol urea) obtained by an addition reaction of urea and formaldehyde. The initial prepolymer of the urea resin may be modified with phenols and benzoguanamine.

The melamine resin is obtained by a dehydration condensation reaction of initial prepolymers (methylolmelamine and dimethylolmelamine) obtained by a addition reaction of melamine and formaldehyde. The initial prepolymer of the melamine resin may be modified with phenols and benzoguanamine.

Commercially available products can be used as the initial prepolymer of the urea resin and the initial prepolymer of the melamine resin, and examples thereof include U-RAMIN series (manufactured by Mitsui Chemicals, Inc.) and NIKA-LAC series (manufactured by Sanwa Chemical Co., Ltd.).

These crosslinking reaction type compounds are appropriately used alone or in combination.

Since a three-dimensional structure is formed and cured by adding such a crosslinking reaction type compound, an antistatic layer having excellent water resistance and durability can be formed without deteriorating optical characteristics and antistatic effect.

A proportion of the crosslinking reaction type compound is, for example, from 10 to 250 parts by weight, and preferably from 30 to 200 parts by weight, based on 100 parts by weight of the conductive polymer.

Examples of the organometallic compound include the same organometallic compound as that contained in the under coat layer of the adhesive film according to the first embodiment, and these organometallic compounds are appropriately used alone or in combination.

Examples of the metal oxide include tin oxide, antimony oxide, indium oxide and zinc oxide, of which tin oxide is preferable.

Examples of the tin oxide include, in addition to tin oxide, antimony-doped tin oxide, indium-doped tin oxide, aluminum-doped tin oxide, tungsten-doped tin oxide, titanium oxide-cerium oxide-tin oxide complex, and titanium oxide-tin oxide complex.

The metal oxide is in the form of particles or needles and its maximum length (average particle size in case of particles) is, for example, from 1 to 100 nm, and preferably from 2 to 50 nm.

These metal oxides are appropriately used alone or in combination.

Examples of the carbon nanomaterial include carbon nanotube, carbon nanohorn, carbon nanowall and fullerene, of which carbon nanotube is preferable.

The carbon nanotube is generally a carbon fiber in the from of a hollow fiber and its diameter is, for example from 0.5 nm to 5 μm, and preferably from 0.5 nm to 1 μm, and its maximum length is, for example, from 10 nm to 1000 μm, and preferably from 10 nm to 100 μm.

These carbon nanomaterials are appropriately used alone or in combination.

Among these water soluble or water dispersible conductive materials, a conductive polymer and an organometallic compound are preferable.

In the adhesive film according to the second embodiment of the present invention, preferably, the antistatic layer further contains an oxazoline group-containing polymer, a mixture of an oxazoline group-containing polymer and a compound having a plurality of carboxyl groups, or a polyamine-based polymer.

The oxazoline group-containing polymer has a principal chain being an acryl skeleton or a styrene skeleton, and has an oxazoline group in a side chain of the principal chain, and is preferably an oxazoline group-containing acrylic polymer which has a principal chain composed of an acryl skeleton and has an oxazoline group in a side chain of the principal chain.

Examples of the oxazoline group include the same oxazoline group as that which is a reactive functional group, with which the resin contained in the under coat layer of the adhesive film according to the first embodiment is modified, and a 2-oxazoline group is preferable.

The 2-oxazoline group is generally represented by the following general formula (5):

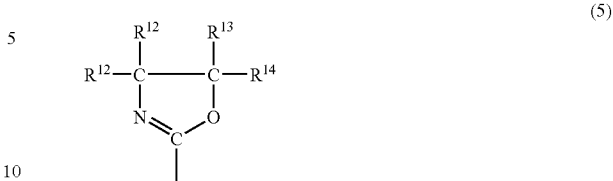

in the general formula (5), $R^{11}$, $R^{12}$, $R^{13}$ and $R^{14}$ each independently represents a hydrogen atom, a halogen atom, an alkyl group, an aralkyl group, a phenyl group or a substituted phenyl group.

A number average molecular weight of the oxazoline group-containing polymer is, for example, 5,000 or more, preferably 10,000 or more and, preferably 1,000,000 or less in general. When the number average molecular weight is less than 5,000, cohesive failure occurs because of poor strength of the under coat layer and an anchoring force may not be improved. On the other hand, when the number average molecular weight is more than 1,000,000, workability may be inferior. The oxazoline value of the oxazoline group-containing polymer is, for example, 1500 g solid/eq. or less, and preferably 1200 g solid/eq. or less. When the oxazoline value is more than 1500 g solid/eq., an amount of the oxazoline group contained in a molecule decreases and the anchoring force may not be improved.

Since the oxazoline group of the oxazoline group-containing polymer reacts with a functional group (for example, carboxyl group or hydroxyl group) contained in the water dispersible adhesive composition at a comparatively low temperature, the oxazoline group-containing polymer reacts with the functional group in the adhesive layer and can firmly adhere to the adhesive layer when the oxazoline group-containing polymer is contained in the antistatic layer.

Commercially available products are used as the oxazoline group-containing polymer, and specific examples thereof include oxazoline group-containing acrylic polymers such as EPOCROS WS-500 (aqueous solution type, solid content: 40%, principal chain: acrylic, pH 7 to 9, oxazoline value: 220 g solid/eq., manufactured by Nippon Shokubai Co., Ltd.) and EPOCROS WS-700 (aqueous solution type, solid content: 25%, principal chain: acrylic, pH 7 to 9, oxazoline value: 220 g solid/eq., manufactured by Nippon Shokubai Co., Ltd.); and oxazoline group-containing acryl/styrene-based polymers such as EPOCROS K-1000 series (emulsion type, solid content: 40%, principal chain: styrene/acrylic, oxazoline value: 1100 g solid/eq., pH 7 to 9, manufactured by Nippon Shokubai Co., Ltd.) and EPOCROS K-2000 series (emulsion type, solid content: 40%, principal chain: styrene/acrylic, pH 7 to 9, oxazoline value: 550 g solid/eq., manufactured by Nippon Shokubai Co., Ltd.). In view of an improvement in adhesion, an aqueous solution-type polymer is preferable as compared with an emulsion type polymer containing an emulsifier.

These oxazoline group-containing polymers are appropriately used alone or in combination.

Generally, when a base material such as optical film is stuck onto an image display device, the optical film is usually stuck onto the image display device and, if necessary, the optical film is once removed for positioning and then stuck again (reworking). However, these adhesives are remained on the surface of the image display device when removed (hereinafter referred to as "adhesive residue"), and thus reworkability is insufficient.

However, when the antistatic layer contains the above-mentioned oxazoline group-containing polymer, it is possible to obtain an adhesive film which is excellent in affinity with the water dispersible adhesive composition and has increased adhesion between the optical film and the water dispersible adhesive composition, and also has excellent heat resistance. As a result, it is possible to obtain an adhesive optical film having an antistatic function, which is excellent in reworkability and heat resistance.

In the mixture of the oxazoline group-containing polymer and the compound having a plurality of carboxyl groups, examples of the compound having a plurality of carboxyl groups include saturated low molecular compound having a plurality of carboxyl groups, for example, dicarboxylic acid compounds such as succinic acid, adipic acid and phthalic acid; and tricarboxylic acid compounds such as citric acid.

The compound having a plurality of carboxyl groups is a polymer compound, and examples thereof include polymers of unsaturated compounds such as acrylic acid and methacrylic acid (for example, polyacrylic acid and polymethacrylic acid); and copolymers of those unsaturated compounds such as copolymer of acrylic acid and methacrylic acid, copolymer of acrylic acid and maleic acid, copolymer of methacrylic acid and maleic acid, and copolymer of acrylic acid, methacrylic acid and maleic acid. A copolymer of acrylic acid and maleic acid is preferable.

A number average molecular weight (measured by GPC in terms of standard polyethylene glycol) of the compound having a plurality of carboxyl groups is, for example, 1,000 or more, and preferably from 3,000 to 200,000.

All or portion of carboxyl groups of the compound having a plurality of carboxyl groups may form a salt with a cation.

Examples of the cation include inorganic cations such as potassium ion and sodium ion; and organic cations such as ammonium ion, and cations of primary amine, secondary amine and tertiary amine.

Commercially available products are usually used as the compound having a plurality of carboxyl groups, and specific examples thereof include POISE 532A (acrylic acid/maleic acid copolymer ammonium salt, number average molecular weight: about 10,000, manufactured by Kao Corporation).

These compounds having a plurality of carboxyl groups are appropriately used alone or in combination.

It is considered in general, in case a water soluble material is used as the antistatic layer, when a thickness of the antistatic layer increases, the strength of the antistatic layer may decrease when used in a high-humidity atmosphere and interlaminar fracture may occur. However, when the antistatic layer is made of the mixture of the oxazoline group-containing polymer and the compound having a plurality of carboxyl groups, the antistatic layer is crosslinked and becomes more firm by a reaction between oxazoline groups of the oxazoline group-containing polymer and carboxyl groups of the compound having a plurality of carboxyl groups, and thus heat resistance and moist heat resistance are improved and adhesion is enhanced.

A proportion of the compound having a plurality of carboxyl groups is, for example, from 1 to 30 parts by weight, preferably from 2 to 20 parts by weight, and more preferably from 3 to 10 parts by weight, based on 100 parts by weight of a total amount of the oxazoline group-containing polymer and the compound having a plurality of carboxyl groups. When the proportion of the compound having a plurality of carboxyl groups is less than 1 part by weight, the effect of crosslinking the antistatic layer may be lowered. On the other hand, when the proportion of the compound having a plurality of carboxyl groups is more than 30 parts by weight, the antistatic layer becomes opaque and optical characteristics may deteriorate.

The polyamine-based polymer is a polymer having a plurality of primary or secondary amino groups in the molecule, and examples thereof include polyethyleneimine; polyallylamine; and ethyleneimine-modified acrylic polymer and allylamine-modified acrylic polymer in which a principal chain composed of an acryl skeleton is contained and a polyethyleneimine chain represented by the following general formula (6) or a polyallylamine chain represented by the following general formula (7) is modified in a side chain of the principal chain. The ethyleneimine-modified acrylic polymer is preferable.

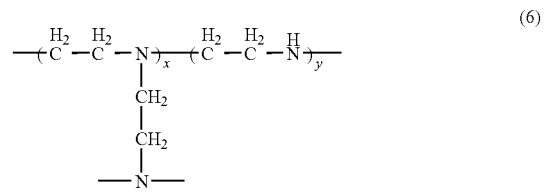

In the general formula (6), x and y represent a polymerization degree of a polyethyleneimine chain.

In the general formula (7), z represents a polymerization degree of a polyallylamine chain.

A number average molecular weight of the polyamine-based polymer is, for example, 200 or more, preferably 1000 or more, and more preferably 8,000 or more, and usually 1,000,000 or less is preferred. When the number average molecular weight is less than 200, cohesive failure occurs because of poor strength of the antistatic layer and the anchoring force may not be improved. On the other hand, when the number average molecular weight is more than 1,000,000, workability may be inferior. An amine hydrogen equivalent of the polyamine-based polymer is, for example, 1500 g solid/eq. or less, and preferably 1200 g solid/eq. or less. When the amine hydrogen equivalent is more than 1500 g solid/eq., an amount of the amino group contained in the molecule decreases and the anchoring force may not be improved.

Commercially available products are used as the polyamine-based polymer, and specific examples thereof include polyethyleneimines such as EPOMIN SP-003 (water soluble type, amine hydrogen equivalent: 47.6 g solid/eq., manufactured by Nippon Shokubai Co., Ltd.), EPOMIN SP-006 (water soluble type, amine hydrogen equivalent: 50.0 g solid/eq., manufactured by Nippon Shokubai Co., Ltd.), EPOMIN SP-012 (water soluble type, amine hydrogen equivalent: 52.6 g solid/eq., manufactured by Nippon Shokubai Co., Ltd.), EPOMIN SP-018 (water soluble type, amine hydrogen equivalent: 52.6 g solid/eq., manufactured by Nippon Shokubai Co., Ltd.), EPOMIN SP-103 (water soluble type, amine hydrogen equivalent: 52.6 g solid/eq., manufactured by Nippon Shokubai Co., Ltd.), EPOMIN SP-110 (water soluble type, amine hydrogen equivalent: 55.6 g solid/eq., manufactured by Nippon Shokubai Co., Ltd.), EPOMIN SP-200 (water soluble type, amine hydrogen equivalent: 55.6 g solid/eq., manufactured by Nippon Shokubai Co., Ltd.) and EPOMIN P-1000 (water soluble type, amine hydrogen equivalent: 52.6 g solid/eq., manufactured by Nippon Shokubai Co., Ltd.); and ethyleneimine-modified acrylic polymers such as POLYMENT SK-1000 (emulsion type, amine hydrogen equivalent: 650 g solid/eq., manufactured by Nippon Shokubai Co., Ltd.), POLYMENT NK-350 (solvent type, amine hydrogen equivalent: 1100 g solid/eq., manufactured by Nippon Shokubai Co., Ltd.), POLYMENT NK-380 (solvent type, amine hydrogen equivalent: 1100 g solid/eq., manufactured by Nippon Shokubai Co., Ltd.), POLYMENT NK-100PM (water soluble type, amine hydrogen equivalent: 350 to 450 g solid/eq., manufactured by Nippon Shokubai Co., Ltd.) and POLYMENT NK-200PM (water soluble type, amine hydrogen equivalent: 350 to 450 g solid/eq., manufactured by Nippon Shokubai Co., Ltd.).

These polyamine-based polymers are appropriately used alone or in combination.

The antistatic layer may contain a binder, in addition to the water soluble or water dispersible conductive material, the oxazoline group-containing polymer, the mixture of the oxazoline group-containing polymer and the compound having a plurality of carboxyl groups, or the component such as polyamine-based polymer.

The binder is optionally used in combination with the above-mentioned respective components for the purpose of improving thin film coatability of the water soluble or water dispersible conductive material and adhesion to the base material such as optical film, and examples thereof include polymer compounds such as polyurethane-based resin, polyester-based resin, acrylic-based resin, polyether-based resin, cellulose-based resin, polyvinyl alcohol-based resin, polyvinyl pyrrolidone-based resin, polystyrene-based resin and polyethylene glycol-based resin; and low molecular compounds such as pentaerythritol. The binder is preferably a polyurethane-based resin, a polyester-based resin or an acrylic-based resin.

These binders are appropriately used alone or in combination according to applications.

The above-mentioned respective components (the water soluble or water dispersible conductive material, the oxazoline group-containing polymer, the mixture of the oxazoline group-containing polymer and the compound having a plurality of carboxyl groups, the polyamine-based polymer, and the binder) are dissolved or dispersed in a solvent to prepare a solution or dispersion of the respective components.

In view of prevention of deterioration of the optical film, an aqueous solution or water dispersion containing these components dissolved or dispersed in water (hereinafter, these are generically referred to as a "coating solution", sometimes) is preferably prepared. More preferable, there may be prepared a coating solution of a water dispersible conductive material, a coating solution of a water dispersible conductive material and an oxazoline group-containing polymer, a coating solution of a water dispersible conductive material, and a mixture of an oxazoline group-containing polymer and a compound having a plurality of carboxyl groups, or a coating solution of a dispersible conductive material and a polyamine-based polymer, each coating solution containing these components dispersed in water.

In these coating solutions, it is not required to use a non-aqueous organic solvent and therefore deterioration of the base material (such as optical film) due to the organic solvent can be suppressed.

The coating solution can contain, in addition to water, alcohols as an aqueous solvent.

Examples of alcohols include methanol, ethanol, n-propanol, isopropanol, n-butanol, isobutanol, sec-butanol, tert-butanol, n-amyl alcohol, isoamyl alcohol, sec-amyl alcohol, tert-amylalcohol, 1-ethyl-1-propanol, 2-ethyl-1-butanol, n-hexanol and cyclohexanol.

In the above-mentioned coating solution, a proportion of the water soluble or water dispersible conductive material is, for example, from 0.05 to 80% by weight, and preferably from 0.1 to 50% by weight. In particular, when the water soluble or water dispersible conductive material is an organometallic compound, the proportion of the organometallic compound is, for example, from 0.1 to 80% by weight, and preferably from 1 to 50% by weight. When the proportion of the organometallic compound is within the above range, a metal content of the organometallic compound in the coating solution is from 0.1 to 20% by weight, and preferably from 1 to 15% by weight, although it varies depending on the composition of the organometallic compound.

A proportion of the oxazoline group-containing polymer is, for example, from 0.01 to 20% by weight, and preferably from 0.05 to 10% by weight, in the coating solution. A proportion of the mixture of the oxazoline group-containing polymer and the compound having a plurality of carboxyl groups is, for example, from 0.01 to 25% by weight, and preferably from 0.05 to 15% by weight, in the coating solution. A proportion of the polyamine-based polymer is, for example, from 0.01 to 20% by weight, and preferably from 0.05 to 10% by weight, in the coating solution.

A proportion of the binder is, for example, from 0.01 to 10% by weight, and preferably from 0.05 to 5% by weigh, in the coating solution.

An antistatic layer is formed by coating and drying the coating solution, as described below.

In the antistatic layer thus formed, a proportion of the water soluble or water dispersible conductive material is, for example, from 10 to 100 parts by weight, and preferably from 20 to 90 parts by weight, based on 100 parts by weight of a total amount of the above-mentioned respective components.

A proportion of the oxazoline group-containing polymer is, for example, from 10 to 500 parts by weight, and preferably from 20 to 400 parts by weight, based on 100 parts by weight of the water soluble or water dispersible conductive material. A proportion of the mixture of the oxazoline group-containing polymer and the compound having a plurality of carboxyl groups is, for example, from 20 to 800 parts by weight, and preferably from 30 to 500 parts by weight, based on 100 parts by weight of the water soluble or water dispersible conductive material. A proportion of the polyamine-based polymer is, for example, from 10 to 500 parts by weight, and preferably from 20 to 300 parts by weight, based on 100 parts by weight of the water soluble or water dispersible conductive material.

A proportion of the binder is, for example, from 5 to 100 parts by weight, and preferably from 10 to 50 parts by weight, based on 100 parts by weight of the water soluble or water dispersible conductive material.

In the adhesive film according to the second embodiment of the present invention, the base material is not specifically limited and examples thereof include an optical film. Such an optical film is not specifically limited as far as it is a film which has optical characteristics and is stuck onto an image display device, and examples thereof include the same base material as that of the adhesive film according to the first embodiment.

An embodiment of a method for producing an adhesive film according to the second embodiment of the present invention will now be described with reference to FIG. 2.

Figure 2:
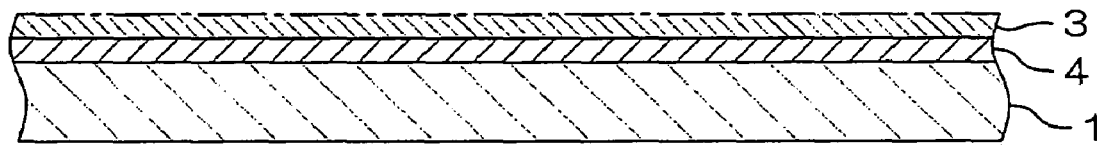
FIG. 2 is an enlarged sectional view showing an adhesive film according to a second embodiment of the adhesive film of the present invention.

In order to obtain the adhesive film according to the second embodiment shown in FIG. 2, first, a base material 1 is prepared and an antistatic layer 4 is laminated on one side of the base material 1.

A thickness of the base material 1 is, for example, from 10 to 1000 μm, and preferably from 50 to 500 μm.

The antistatic layer 4 is formed, for example, by directly coating the above-mentioned coating solution containing a water soluble or water dispersible conductive material onto the optical film 1 of the adhesive film according to the first embodiment using the same method of coating the undercoating solution onto the base material 1 of the adhesive film according to the first embodiment, followed by drying.

Thus, an adhesion (anchoring force) with the adhesive layer 3 can be improved by forming the antistatic film 4.

A thickness of the antistatic layer 4 is set so that the thickness before drying is, for example, from 1 to 500 μm, preferably from 10 to 100 μm, and more preferably from 20 to 50 μm, and the thickness after drying is, for example, from 1 to 1000 nm, preferably from 10 to 500 nm, and more preferably from 20 to 400 nm. When the thickness is within the above range, it is possible to effectively prevent the adhesive film and the adherend from being charged.

In the state that the antistatic layer 4 is formed on the base material 1, normally a surface resistance thereof is preferably from $1 \times 10^{12}$ Ω/□ or less, more preferably $1 \times 10^{11}$ Ω/□ or less, and particularly preferably $1 \times 10^{10}$ Ω/□ or less. In case the surface resistance exceeds $1 \times 10^{12}$ Ω/□, antistatic function is insufficient. Therefore, when the surface protective film described in the following examples is removed, static electricity is generated thereby to cause problems such as breakage of a circuit of the image display device and disturbance of images of the image display device.

Then, an adhesive layer 3 is formed on one side of the base material 1 via the antistatic layer 4.

The adhesive layer 3 is formed, for example, by transferring adhesive layer 3 to the above antistatic film 4 from a release film on which the adhesive layer 3 is formed.

Examples of the release film include the same release film as that used to transfer the adhesive layer 3 of the adhesive film according to the first embodiment onto the under coat layer 2.

The release film on which the adhesive layer 3 is formed can be formed by directly coating a water dispersible adhesive composition onto the release film using the same coater as that used to form the adhesive layer 3 of the adhesive film according to the first embodiment on the release film, followed by drying to form the adhesive layer 3. To transfer the adhesive layer 3, the release film on which the adhesive layer 3 is formed is laminated with the base material 1 on which the antistatic layer 4 is formed so as to contact the antistatic layer 4 with the adhesive layer 3, and then the release film is removed from the adhesive layer 3.

The adhesive layer 3 can also be formed, for example, by directly coating a water dispersible adhesive composition onto the antistatic layer 4 using the same coater as that used to directly coat the acrylic adhesive used in the adhesive film according to the first embodiment onto the under coat layer 2, followed by drying.

A thickness (thickness after drying) of the adhesive layer 3 is the same as that described above, and is preferably set within a range from 5 to 50 μm, and more preferably from 10 to 30 μm.

As described above, there can be obtained an adhesive film according to the second embodiment, comprising a base material 1; an adhesive layer 3 laminated on one side of the base material 1; and an antistatic layer 4 which is interposed between the base material 1 and the adhesive layer 3.

The adhesive film according to the second embodiment thus obtained is used for various industrial purposes as a polarizing film, a phase difference film, a luminance improving film and a view-angle expansion film.

The adhesive film according to the second embodiment is provided with the antistatic layer 4 which is interposed between the base material 1 and the adhesive layer 3 and also contains a water soluble or water dispersible conductive material and is therefore less likely to be charged and also can enhance adhesion between the base material 1 and the adhesive layer 3. Therefore, the adhesive film can effectively prevent static charge on peeling generated when the surface protective film is removed and also can be used in various industrial fields such as electrics and electronics, semiconductors and optics as an adhesive film having high adhesion between the base material 1 and the adhesive layer 3.

The adhesive film according to the second embodiment can also be used as an adhesive sheet and an adhesive tape, in addition to the above-mentioned adhesive film. Preferably, this adhesive film is used as an adhesive optical film comprising an optical film as the base material 1.

When the adhesive film according to the second embodiment is used as the adhesive optical film, it can attain firm bonding because of high adhesion between an image display device and a glass substrate.

Further, since the adhesive film according to the second embodiment has excellent heat resistance and moist heat resistance, when the adhesive film is used as an adhesive optical film, by sticking the adhesive film onto a surface of a glass substrate of image display devices such as a liquid crystal display (LCD), an organic electroluminescence device (organic EL display device) and a plasma display panel (PDP), excellent durability can be obtained even under a high-temperature atmosphere and a high-temperature and high-humidity atmosphere. Therefore, the resulting image display device can realize excellent heat resistance and moist heat resistance.

In the above description, the antistatic layer 4 and the adhesive layer 3 are formed on one side of the base material 1 and may be formed on both sides of the base material 1.

In a conventional water dispersible adhesive, a tackifying resin such as rosin-based resin or elastomer is added so as to enhance adhesion to an adherend. However, since the water dispersible adhesive composition used in the adhesive film according to the second embodiment of the present invention can enhance adhesion without adding the tackifying resin, regardless of water dispersibility, and thus it is possible to obtain an adhesive film comprising an adhesive layer made of a water dispersible adhesive composition, having high adhesion and being at low cost, and an image display device comprising such an adhesive film.

EXAMPLES

The present invention will now be described in more detail by way of following Examples and Comparative Examples. However, the present invention is not limited to the following, Examples and Comparative Examples. In the following description, "parts" and "%" are by weight standard unless otherwise specified.

Synthesis Example 1

Preparation of acrylic adhesive

In a vessel, 100 parts of butyl acrylate, 5 parts of acrylic acid and 0.015 parts of 3-methacryloyloxypropyl-trimethoxysilane (KBM-503, manufactured by SHIN-ETSU CHEMICAL CO., LTD.) were charged and mixed to prepare a vinyl monomer mixture. To 627 g of the vinyl monomer mixture thus prepared, 13 g of a reactive emulsifier AQUALON HS-10 (manufactured by Dai-Ichi Kogyo Seiyaku Co., Ltd.) and 360 g of ion-exchange water were added and the mixture was forcibly emulsified with stirring at 6000 (1/min) for 5 minutes using a homogenizer (manufactured by Tokusyu Kika Kogyo Co., Ltd.) to prepare a monomer preemulsion.

Next, in a reaction vessel equipped with a condenser tube, a nitrogen introducing tube, a thermometer and a stirrer, 200 g of the above-prepared monomer preemulsion and 330 g of ion-exchange water were charged, and after replacing the atmosphere in the reaction vessel by nitrogen, 0.2 g of 2,2'-azobis[N-(2-carboxyethyl)-2-methylpropioneamidine]hydrate (VA-057, manufactured by Wako Pure Chemical Industries, Ltd.) was added, followed by polymerization with stirring at 60° C. for one hour. Then, 800 g of the residual monomer preemulsion was added dropwise in the reaction vessel over 3 hours while maintaining the temperature of the reaction vessel at 60° C., followed by polymerization for 3 hours to obtain an emulsion of a water dispersible adhesive having a solid content of 48%. After cooling the emulsion to room temperature, the pH was adjusted to 8 by adding 10% ammonia water.

Formation of Adhesive Film

The water dispersible acrylic adhesive thus prepared was coated onto a release film (polyethylene terephthalate base material, DIAFOIL MRF38, manufactured by Mitsubishi Polyester Film Corp.), followed by a heat treatment at 100° C. for 2 minutes using a hot air circulating oven to form an adhesive layer having a dry thickness of 21 µm directly on the release film.

Preparation of Optical Film

A polyvinyl alcohol film (thickness: 80 µm) was stretched by 5 times as long as the original length in an aqueous iodine solution at 40° C., pulled up from the aqueous iodine solution and then dried at 50° C. for 4 minutes to obtain a polarizer. Using a polyvinyl alcohol-based adhesive, triacetyl cellulose film as a transparent protective film was bonded to both sides of the polarizer to obtain an optical film.

Example 1

Formation of Under Coat Layer

BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was diluted with a solution mixture of water and ethanol (weight ratio: 1:1) so as to adjust the $ZrO_2$ content to 2% (Zr content: 1.48%) to prepare an undercoating solution. This undercoating solution was coated onto one side of the above-mentioned optical film using a wire bar #5, and dried at 40° C. for 2 minutes to form an under coat layer.

Production of Adhesive Film

The release film of Synthesis Example 1 was laminated on the side of the optical film, on which the under coat layer is formed, so as to contact the under coat layer with an adhesive layer, and thus an adhesive film was produced.

Example 2

In the same manner as in Example 1, except that, in the formation of the under coat layer of Example 1, the $ZrO_2$ content of 2% (Zr content: 1.48%) of the undercoating solution was replaced by the $ZrO_2$ content of 5% (Zr content: 3.70%), an under coat layer was formed and then an adhesive film was produced.

Example 3

In the same manner as in Example 1, except that, in the formation of the under coat layer of Example 1, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS ZB-120 (zirconium chloride compound, $ZrO_2$ content: 15%, manufactured by Matsumoto Chemical Industry Co., Ltd.), an under coat layer was formed and then an adhesive film was produced.

Example 4

In the same manner as in Example 3, except that, in the formation of the under coat layer of Example 3, the $ZrO_2$ content of 2% (Zr content: 1.48%) of the undercoating solution was replaced by the $ZrO_2$ content of 5% (Zr content: 3.70%), an under coat layer was formed and then an adhesive film was produced.

Example 5

In the same manner as in Example 3, except that, in the formation of the under coat layer of Example 3, the $ZrO_2$ content of 2% (Zr content: 1.48%) of the undercoating solution was replaced by the $ZrO_2$ content of 10% (Zr content: 7.40%), an under coat layer was formed and then an adhesive film was produced.

Example 6

In the same manner as in Example 1, except that, in the formation of the under coat layer of Example 1, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS ZB-125 (zirconium chloride compound, $ZrO_2$ content: 15%, manufactured by Matsumoto Chemical Industry Co., Ltd.), an under coat layer was formed and then an adhesive film was produced.

Example 7

In the same manner as in Example 6, except that, in the formation of the under coat layer of Example 6, $ZrO_2$ content of 2% (Zr content: 1.48%) of the undercoating solution was replaced by the $ZrO_2$ content of 5% (Zr content: 3.70%), an under coat layer was formed and then an adhesive film was produced.

Example 8

In the same manner as in Example 6, except that, in the formation of the under coat layer of Example 6, $ZrO_2$ content of 2% (Zr content: 1.48%) of the undercoating solution was replaced by the $ZrO_2$ content of 10% (Zr content: 7.40%), an under coat layer was formed and then an adhesive film was produced.

Example 9

In the same manner as in Example 1, except that, in the formation of the under coat layer of Example 1, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS TC-310 (titanium lactate, $(OH)_2Ti(C_3H_5O_2)_2$, Ti content: 8%, manufactured by Matsumoto Chemical Industry Co., Ltd.) and the Ti content of the undercoating solution was adjusted to 2%, an under coat layer was formed and then an adhesive film was produced.

Example 10

In the same manner as in Example 9, except that, in the formation of the under coat layer of Example 9, the Ti content of 2% of the undercoating solution was replaced by the Ti content of 5%, an under coat layer was formed and then an adhesive film was produced.

Example 11

In the same manner as in Example 9, except that, in the formation of the under coat layer of Example 9, the Ti content of 2% of the undercoating solution was replaced by the Ti content of 7%, an under coat layer was formed and then an adhesive film was produced.

Example 12

In the same manner as in Example 1, except that, in the formation of the under coat layer of Example 1, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS TC-400 ((diisopropoxytitanium bis(triethanolaminate), $(C_3H_7O)_2Ti(C_6H_{14}O_3N)_2$, Ti content: 8%, manufactured by Matsumoto Chemical Industry Co., Ltd.) and the Ti content of the undercoating solution was adjusted to 2%, an under coat layer was formed and then an adhesive film was produced.

Example 13

In the same manner as in Example 12, except that, in the formation of the under coat layer of Example 12, the Ti content of 2% of the undercoating solution was replaced by the Ti content of 5%, an under coat layer was formed and then an adhesive film was produced.

Example 14

Formation of Under Coat Layer

BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was diluted with water so as to adjust the $ZrO_2$ content to 2% (Zr content: 1.48%) and POLYMENT SK-1000 (ethyleneimine-modified acrylic resin, solid content: 38%, manufactured by NIPPON SHOKUBAI CO., LTD.) was diluted with water so as to adjust the solid content to 2% to prepare an undercoating solution. This undercoating solution was coated onto one side of the above-mentioned optical film using a wire bar #5, and dried at 40° C. for 2 minutes to form an under coat layer.

Production of Adhesive Film

The release film of Synthesis Example 1 was laminated on the side of the optical film, on which the under coat layer is formed, so as to contact the under coat layer with an adhesive layer, and thus an adhesive film was produced.

Example 15

In the same manner as in Example 14, except that, in the formation of the under coat layer of Example 14, the $ZrO_2$ content of 2% (Zr content: 1.48%) was replaced by the $ZrO_2$ content of 5% (Zr content: 3.70%), an under coat layer was formed and then an adhesive film was produced.

Example 16

In the same manner as in Example 14, except that, in the formation of the under coat layer of Example 14, the $ZrO_2$ content of 2% (Zr content: 1.48%) was replaced by the $ZrO_2$ content of 10% (Zr content: 7.40%), an under coat layer was formed and then an adhesive film was produced.

Example 17

In the same manner as in Example 14, except that, in the formation of the under coat layer of Example 14, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS ZB-125 (zirconium chloride compound, $ZrO_2$ content: 15%, manufactured by Matsumoto Chemical Industry Co., Ltd.), an under coat layer was formed and then an adhesive film was produced.

Example 18

In the same manner as in Example 17, except that, in the formation of the under coat layer of Example 17, the $ZrO_2$ content of 2% (Zr content: 1.48%) was replaced by the $ZrO_2$ content of 5% (Zr content: 3.70%), an under coat layer was formed and then an adhesive film was produced.

Example 19

In the same manner as in Example 14, except that, in the formation of the under coat layer of Example 14, BAYCOAT 20 (ammonium zirconium carbonate, $(NH_4)_2[Zr(CO_3)_2(OH)_2]$, $ZrO_2$ content: 20%, manufactured by Nippon Light Metal Co., Ltd.) was replaced by ORGATICS TC400 ((diisopropoxytitanium bis(triethanolaminate), $(C_3H_7O)_2Ti(C_6H_{14}O_3N)_2$, Ti content: 8%, manufactured by Matsumoto Chemical Industry Co., Ltd.) and the Ti content of the undercoating solution was adjusted to 2%, an under coat layer was formed and then an adhesive film was produced.

Example 20

In the same manner as in Example 19, except that, in the formation of the under coat layer of Example 19, the Ti content of 2% was replaced by the Ti content of 5%, an under coat layer was formed and then an adhesive film was produced.

Example 21

Formation of Under Coat Layer

ORGATICS ZB-120 (zirconium chloride compound, $ZrO_2$ content: 15%, manufactured by Matsumoto Chemical Industry Co., Ltd.) was diluted with water so as to adjust the $ZrO_2$ content to 5% and VONCOAT 5030 (acryl/urethane hybrid emulsion, solid content: 50%, manufactured by Dainippon Ink and Chemicals, Inc.) was diluted with water so as to adjust the solid content to 2% to prepare an undercoating solution. This undercoating solution was coated onto one side of the above-mentioned optical film using a wire bar #5 and dried at 40° C. for 2 minutes to form an under coat layer.

Production of Adhesive Film

The release film of Synthesis Example 1 was laminated on the side of the optical film, on which the under coat layer is formed, so as to contact the under coat layer with an adhesive film.

Example 22

Formation of Under Coat Layer

ORGATICS TC-310 (titanium lactate, $(OH)_2Ti(C_3H_5O_2)_2$, Ti content: 8%, manufactured by Matsumoto Chemical Industry Co., Ltd.) was diluted with water so as to adjust the Ti content to 5% and VONCOAT 5030 (acryl/urethane hybrid emulsion, solid content: 50%, manufactured by Dainippon Ink and Chemicals, Inc.) was diluted with water so as to adjust the solid content to 2% to prepare an under coating solution. This under coating solution was coated onto one side of the above-mentioned optical film using a wire bar #5, and dried at 40° C. for 2 minutes to form an under coat layer.

Production of Adhesive Film

The release film of Synthesis Example 1 was laminated on the side of the optical film, on which the under coat layer is formed, so as to contact the under coat layer with an adhesive film.

Example 23

In the same manner as in Example 4, except that, in the production of the adhesive film of Example 4, the optical film was replaced by a polyethylene terephthalate film (Lumirror S-10#50, manufactured by Toray Industries, Inc.), an adhesive film was produced.

Example 24

In the same manner as in Example 17, except that, in the production of the adhesive film of Example 17, the optical film was replaced by a polyethylene terephthalate film (Lumirror S-10#50, manufactured by Toray Industries, Inc.), an adhesive film was produced.

Example 25

In the same manner as in Example 21, except that, in the production of the adhesive film of Example 21, the optical film was replaced by a polyethylene terephthalate film (Lumirror S-10#50, manufactured by Toray Industries, Inc.), an adhesive film was produced.

Example 26

In the same manner as in Example 22, except that, in the production of the adhesive film of Example 22, the optical film was replaced by a polyethylene terephthalate film (Lumirror S-10#50, manufactured by Toray Industries, Inc.), an adhesive film was produced.

Example 27

Formation of Under Coat Layer

ORGATICS ZB-125 (zirconium chloride compound, $ZrO_2$ content: 15%, manufactured by Matsumoto Chemical Industry Co., Ltd.) was diluted with water so as to adjust the $ZrO_2$ content to 2% (Zr content: 1.48%) and EPOCROS WS-700 (oxazoline group-containing acrylic resin, solid content: 25%, manufactured by NIPPON SHOKUBAI CO., LTD.) was diluted with water so as to adjust the solid content to 2% to prepare an undercoating solution. This under coating solution was coated onto one side of the above-mentioned optical film using a wire bar #5, and dried at 40° C. for 2 minutes to form an under coat layer.

Production of Adhesive Film

The release film of Synthesis Example 1 was laminated on the side of the optical film, on which the under coat layer is formed, so as to contact the under coat layer with an adhesive film.

Example 28

Formation of Under Coat Layer

ORGATICS ZB-125 (zirconium chloride compound, $ZrO_2$ content: 15%, manufactured by Matsumoto Chemical Industry Co., Ltd.) was diluted with water so as to adjust the $ZrO_2$ content to 2% (Zr content: 1.48%) and POLYMENT SK-1000 (ethyleneimine-modified acrylic resin, solid content: 38%, manufactured by NIPPON SHOKUBAI CO., LTD.) was diluted with water so as to adjust the solid content to 1.9% and, furthermore, EPOCROS WS-700 (oxazoline group-containing acrylic resin, solid content: 25%, manufactured by NIPPON SHOKUBAI CO., LTD.) was diluted with water so as to adjust the solid content to 0.1% to prepare an undercoating solution. This under coating solution was coated onto one side of the above-mentioned optical film using a wire bar #5, and drying at 40° C. for 2 minutes to form an under coat layer.

Production of adhesive film

The release film of Synthesis Example 1 was laminated on the side of the optical film, on which the under coat layer is formed, so as to contact the under coat layer with an adhesive film.

Comparative Example 1

The release film of Synthesis Example 1 was laminated on one side of the above-mentioned optical film to produce an adhesive film.

Comparative Example 2

The release film of Synthesis Example 1 was laminated on one side of a polyethylene terephthalate film (Lumirror S-10#50, manufactured by Toray Industries, Inc.) to produce an adhesive film.

Evaluation

1) Surface Resistance of Optical Film

In Examples 1 to 28 and Comparative Examples 1 and 2, surface resistance of the side of the optical film, on which the under coat layer is formed, was measured at an applied voltage of 500 V by a resistivity meter (Hiresta-Up MCP-HT450, manufactured by Dia Instruments Co., Ltd.) using a USR probe. The results are shown in Table 1.

2) Surface Resistance of Adhesive Layer

In Examples 1 to 28 and Comparative Examples 1 and 2, the release film of the adhesive film was removed. Then, surface resistance of the adhesive layer removed was measured at an applied voltage of 500 V by a resistivity meter (Hiresta-Up MCP-HT450, manufactured by Dia Instruments Co., Ltd.) using a USR probe. The results are shown in Table 1.

3) Initial Adhesion Between Base Material and Adhesive Layer

Each of the adhesive films of Examples 1 to 28 and Comparative Example 1 and 2 was cut into pieces measuring 25 mm×120 mm to obtain a sample. The release film of each sample was removed and a polypropylene porous film was stuck onto the adhesive surface of the sample and then an adhesive tape (No. 31B, manufactured by NITTO DENKO CORPORATION) was stuck onto the polypropylene porous film, thereby to reinforce the sample. Then, the sample was allowed to stand in an atmosphere at 23° C. and 60% RH for 24 or more hours. After standing, a SUS304 steel plate was attached to the back side (optical film side of the adhesive film) of the adhesive film using a two-sided tape and was removed from the interface between the polypropylene porous film and the sample at a rate of 300 mm/min in the direction of 180° using a tensile tester. After confirming the adhesive layer adhered onto the polypropylene porous film side, a peeling stress was measured. The results are shown in Table 1.

4) Adhesion Between Base Material and Adhesive Layer with Time

Each of the adhesive films of Examples 1 to 28 and Comparative Example 1 and 2 was cut into pieces measuring 25 mm×120 mm to obtain a sample. Each sample was aged in an atmosphere at 50° C. for 7 days. After aging, the release film of each sample was removed and a polypropylene porous film was stuck onto the adhesive surface of the sample and then an adhesive tape (No. 31B, manufactured by NITTO DENKO CORPORATION) was stuck onto the polypropylene porous film, thereby to reinforce the sample. Then, the sample was allowed to stand in an atmosphere at 23° C. and 60% RH for 24 or more hours. After standing, a SUS304 steel plate was attached to the back side (optical film side of the adhesive film) of the adhesive film using a two-sided tape and was removed from the interface between the polypropylene porous film and the sample at a rate of 300 mm/min in the direction of 1800 using a tensile tester. After confirming the adhesive layer adhered onto the polypropylene porous film side, a peeling stress was measured. The results are shown in Table 1.

As is apparent from Table 1, when the under coat layer contains an organometallic compound, charging can be prevented and adhesion increases. It is also apparent that, when the under coat layer contains a resin, adhesion further increases. It is also apparent that adhesion of the adhesive film further increases by aging.

TABLE 1

| | Surface resistance [Ω/□] | | Adhesion (N/25 mm) | |
|---|---|---|---|---|
| | Base material (Undercoat layer) | Adhesive layer | Initial | After standing at 50° C. for 7 days |
| Example 1 | $2 \times 10^{11}$ | $2 \times 10^{11}$ | — | — |
| Example 2 | $4 \times 10^{10}$ | $7 \times 10^{10}$ | — | — |
| Example 3 | $7 \times 10^{9}$ | $2 \times 10^{10}$ | 7.2 | 7.8 |
| Example 4 | $2 \times 10^{9}$ | $8 \times 10^{9}$ | 7.2 | 9.5 |
| Example 5 | $5 \times 10^{8}$ | $5 \times 10^{9}$ | 7.2 | 9.0 |
| Example 6 | $2 \times 10^{10}$ | $5 \times 10^{10}$ | 7.0 | 9.4 |
| Example 7 | $1 \times 10^{10}$ | $2 \times 10^{10}$ | 7.2 | 9.5 |
| Example 8 | $5 \times 10^{9}$ | $1 \times 10^{10}$ | 7.2 | 9.9 |
| Example 9 | $4 \times 10^{11}$ | $3 \times 10^{12}$ | 7.2 | 8.9 |
| Example 10 | $1 \times 10^{11}$ | $1 \times 10^{12}$ | 7.7 | 9.2 |
| Example 11 | $3 \times 10^{10}$ | $2 \times 10^{11}$ | 8.0 | 9.9 |
| Example 12 | $1 \times 10^{12}$ | $7 \times 10^{12}$ | 8.3 | 11.6 |
| Example 13 | $1 \times 10^{11}$ | $5 \times 10^{11}$ | 4.8 | 8.9 |
| Example 14 | $7 \times 10^{11}$ | $1 \times 10^{12}$ | 6.1 | 12.8 |
| Example 15 | $3 \times 10^{10}$ | $6 \times 10^{10}$ | 6.1 | 11.4 |
| Example 16 | $1 \times 10^{9}$ | $6 \times 10^{9}$ | 6.1 | 11.4 |
| Example 17 | $6 \times 10^{9}$ | $2 \times 10^{10}$ | 8.0 | 11.0 |

TABLE 1-continued

| | Surface resistance [Ω/□] | | Adhesion (N/25 mm) | |
|---|---|---|---|---|
| | Base material (Undercoat layer) | Adhesive layer | Initial | After standing at 50° C. for 7 days |
| Example 18 | $3 \times 10^{9}$ | $1 \times 10^{10}$ | 8.2 | 11.2 |
| Example 19 | $5 \times 10^{9}$ | $2 \times 10^{10}$ | 9.0 | 11.5 |
| Example 20 | $1 \times 10^{11}$ | $3 \times 10^{11}$ | 7.2 | 9.5 |
| Example 21 | $7 \times 10^{11}$ | $4 \times 10^{12}$ | 7.1 | 10.0 |
| Example 22 | $2 \times 10^{11}$ | $7 \times 10^{11}$ | 9.6 | 12.6 |
| Example 23 | $2 \times 10^{9}$ | $9 \times 10^{9}$ | 2.0 | 3.4 |
| Example 24 | $2 \times 10^{10}$ | $5 \times 10^{10}$ | 2.9 | 3.4 |
| Example 25 | $7 \times 10^{9}$ | $2 \times 10^{10}$ | 5.6 | 7.4 |
| Example 26 | $1 \times 10^{11}$ | $2 \times 10^{11}$ | 4.9 | 7.2 |
| Example 27 | $2 \times 10^{10}$ | $5 \times 10^{10}$ | 8.3 | 15.0 |
| Example 28 | $7 \times 10^{10}$ | $9 \times 10^{10}$ | 5.7 | 13.0 |
| Comparative Example 1 | $\geq 1 \times 10^{14}$ | $\geq 1 \times 10^{14}$ | 4.4 | 4.3 |
| Comparative Example 2 | $\geq 1 \times 10^{14}$ | $\geq 1 \times 10^{14}$ | 2.1 | 1.9 |

Synthesis Example 2

Preparation of monomer preemulsion

In a vessel, 100 parts of butyl acrylate, 5 parts of acrylic acid, 2 parts of mono[poly(propylene oxide)methacrylate] phosphate ester (average polymerization degree of propylene oxide: about 5.0) and 0.01 parts of 3-methacryloyloxypropyl-trimethoxysilane (KBM-503, manufactured by SHIN-ETSU CHEMICAL CO., LTD.) as raw monomers were charged and mixed to prepare a monomer mixture. To 627 g of the monomer mixture thus prepared, 13 g of a reactive emulsifier AQUALON HS-10 (manufactured by Dai-Ichi Kogyo Seiyaku Co., Ltd.) and 360 g of ion-exchange water were added and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of water dispersible adhesive composition

In a reaction vessel equipped with a condenser tube, a nitrogen introducing tube, a thermometer and a stirrer, 200 g of the resulting monomer preemulsion and 330 g of ion-exchange water were charged, and after replacing the atmosphere in the reaction vessel by nitrogen, 0.2 g of 2,2'-azobis [N-(2-carboxyethyl)-2-methylpropioneamidine]hydrate (VA-057, manufactured by Wako Pure Chemical Industries, Ltd.) was added, followed by polymerization at 60° C. for one hour. Then, 800 g of the residual monomer preemulsion was added dropwise in the reaction vessel over 3 hours, followed by polymerization for 3 hours. Furthermore, the polymerization was conducted at 60° C. for 3 hours while replacing the atmosphere by nitrogen to obtain an emulsion solution of a water dispersible adhesive composition having a solid content of 48%. After cooling the emulsion solution to room temperature, the pH was adjusted to 8 by adding 10% ammonia water and 3.0 g of an acrylic thickener ARON B-500 (manufactured by Toagosei Co., Ltd.) was added to prepare a water dispersible adhesive composition.

In the water dispersible adhesive composition, a carboxyl group concentration is 0.65 mmol/g. This calculation was conducted assuming that the molecular weight of acrylic acid is 72.

In the water dispersible adhesive composition, a phosphoric acid group concentration is 0.04 mmou/g. This calculation was conducted assuming that the molecular weight (average molecular weight) of mono[poly(propylene oxide)methacrylate]phosphate ester (average polymerization degree of propylene oxide: about 5.0) is 456.

Formation of adhesive ailm

The water dispersible acrylic adhesive was coated onto a release film (polyethylene terephthalate base material, DLI-FOIL MNF38, manufactured by Mitsubishi Polyester Film Corp.), followed by a heat treatment at 100° C. for 2 minutes using a hot air circulating oven to form an adhesive layer having a dry thickness of 23 μm on the release film.

Preparation of optical film

A polyvinyl alcohol film (thickness: 80 μm) was stretched by 5 times as long as the original length in an aqueous iodine solution at 40° C., pulled up from the aqueous iodine solution and then dried at 50° C. for 4 minutes to obtain a polarizer. Using a polyvinyl alcohol-based adhesive, triacetyl cellulose film as a transparent protective film was bonded to both sides of the polarizer to obtain an optical film.

Example 29

Formation of antistatic layer

Denatron P502RG (polythiophene-based conductive polymer, manufactured by Nagase ChemteX Corporation) was diluted with a solution mixture of water and isopropanol (weight ratio: 1:1) so as to adjust the solid content to 0.5% by weight to prepare a coating solution of an antistatic layer. This under coating solution was coated onto one side of the optical film using a wire bar #5 and dried at 40° C. for 2 minutes to form an antistatic layer.

Formation of adhesive optical film

The release film comprising an adhesive layer formed thereon was laminated on one side of the optical film, on which the antistatic layer is formed, to form an adhesive optical film.

Example 30

In the same manner as in Example 29, except that, in the preparation of the coating solution of the antistatic layer of Example 29, Denatron P502RG (polythiophene-based conductive polymer, manufactured by Nagase ChemteX Corporation) was replaced by Denatron P502RG (manufactured by Nagase ChemteX Corporation, polythiophene-based conductive polymer) and EPOCROS WS-700 (oxazoline group-containing acrylic polymer, manufactured by NIPPON SHOKUBAI CO., LTD.) and that the solid content of Denatron P502RG is replaced by 1.0% by weight and that of EPOCROS WS-700 was replaced by 0.25% by weight, an antistatic layer was formed and then an adhesive optical film was produced.

Example 31

In the same manner as in Example 29, except that, in the preparation of the coating solution of the antistatic layer of Example 29, Denatron P502RG (polythiophene-based conductive polymer, manufactured by Nagase ChemteX Corporation) was replaced by ORGATICS ZB-125 (zirconium chloride compound, $ZrO_2$ content: 15%, manufactured by Matsumoto Chemical Industry Co., Ltd.) and the solution mixture of water and isopropanol (weight ratio: 1:1) was replaced by a solution mixture of water and ethanol (weight ratio: 1:1) and, furthermore, the $ZrO_2$ content is adjusted to 2% by weight, an antistatic layer was formed and then an adhesive optical film was produced.

Example 32

In the same manner as in Example 31, except that, in the formation of the antistatic layer of Example 31, the $ZrO_2$ content of the coating solution was changed to 5% from 2%, an antistatic layer was formed and then an adhesive optical film was produced.

Example 33

In the same manner as in Example 29, except that, in the formation of the antistatic layer of Example 29, Denatron P502RG (polythiophene-based conductive polymer, manufactured by Nagase ChemteX Corporation) was replaced by ORGATICS TC-400 (diisopropoxytitanium bis(triethanolaminate), $(C_3H_7O)_2Ti(C_6H_{14}O_3N)_2$, Ti content: 8%, manufactured by Matsumoto Chemical Industry Co., Ltd.) and the Ti content of the coating solution was adjusted to 2%, an antistatic layer was formed and then an adhesive optical film was produced.

Example 34

In the same manner as in Example 33, except that, in the formation of the antistatic layer of Example 33, the Ti content of the coating solution was changed to 5% from 2%, an antistatic layer was formed and then an adhesive optical film was produced.

Example 35

In the same manner as in Example 31, except that, in the formation of the antistatic layer of Example 31, ORGATICS ZB-125 (zirconium chloride compound, $ZrO_2$ content: 15%, manufactured by Matsumoto Chemical Industry Co., Ltd.) was replaced by ORGATICS ZB-125 (zirconium chloride compound, $ZrO_2$ content: 15%, manufactured by Matsumoto Chemical Industry Co., Ltd.) and POLYMENT SK-1000 (ethyleneimine-modified acrylic polymer, manufactured by NIPPON SHOKUBAI CO., LTD.) and the solution mixture of water and ethanol (weight ratio: 1:1) was replaced by water and, furthermore, the $ZrO_2$ content of ORGATICS ZB-125 was replaced by 2% and the solid content of POLYMENT SK-1000 was replaced by 2%, an antistatic layer was formed and then an adhesive optical film was produced.

Example 36

In the same manner as in Example 35, except that, in the formation of the antistatic layer of Example 35, the $ZrO_2$ content of ORGATICS ZB-125 was changed to 5% by weight from 2% by weight, an antistatic layer was formed and then an adhesive optical film was produced.

Example 37

In the same manner as in Example 33, except that, in the formation of the antistatic layer of Example 33, ORGATICS TC-400 (diisopropoxytitanium bis(triethanolaminate), $(C_3H_7O)_2Ti(C_6H_{14}O_3N)_2$, Ti content: 8%, manufactured by Matsumoto Chemical Industry Co., Ltd.) was replaced by ORGATICS TC-400 (diisopropoxytitanium bis(triethanolaminate), $(C_3H_7O)_2Ti(C_6H_{14}O_3N)_2$, Ti content: 8%, manufactured by Matsumoto Chemical Industry Co., Ltd.) and POLYMENT SK-1000 (ethyleneimine-modified acrylic polymer, manufactured by NIPPON SHOKUBAI CO., LTD.) and, furthermore, the Ti content of the coating solution was replaced by 2% and the solid content of POLYMENT SK-1000 was replaced by 2%, an antistatic layer was formed and then an adhesive optical film was produced.

Example 38

In the same manner as in Example 37, except that, in the formation of the antistatic layer of Example 37, the Ti content of the coating solution was changed to 5% from 2%, an antistatic layer was formed and then an adhesive optical film was produced.

Example 39

In the same manner as in Example 29, except that, in the preparation of the coating solution of the antistatic layer of Example 29, Denatron P502RG (polythiophene-based conductive polymer, manufactured by Nagase ChemteX Corporation) was replaced by ORGATICS ZB-125 (zirconium chloride compound, $ZrO_2$ content: 15%, manufactured by Matsumoto Chemical Industry Co., Ltd.) and EPOCROS WS-700 (oxazoline group-containing acrylic resin, solid content: 25%, manufactured by NIPPON SHOKUBAI CO., LTD.) and the solution mixture of water and ethanol (weight ratio: 1:1) was replaced by water and, furthermore, the $ZrO_2$ content of ORGATICS ZB-125 was replaced by 2% by weight and the solid content of EPOCROS WS-700 was replaced by 2%, an antistatic layer was formed and then an adhesive optical film was produced.

Example 40

In the same manner as in Example 29, except that, in the preparation of the coating solution of the antistatic layer of Example 29, Denatron P502RG (polythiophene-based conductive polymer, manufactured by Nagase ChemteX Corporation) was replaced by ORGATICS ZB-125 (zirconium chloride compound, $ZrO_2$ content: 15%, manufactured by Matsumoto Chemical Industry Co., Ltd.) and EPOCROS WS-700 (oxazoline group-containing acrylic resin, solid content: 25%, manufactured by NIPPON SHOKUBAI CO., LTD.) and Poise 532A (acrylic acid/maleic acid copolymer ammonium salt, number average molecular weight: about 10000, manufactured by Kao Corporation.) and, furthermore, the $ZrO_2$ content ORGATICS ZB-125 was replaced by 2% by weight, EPOCROS WS-700 of the solid content is replaced by 2% by weight and the solid content of POISE 532A was replaced by 0.1% by weigh, an antistatic layer was formed and then an adhesive optical film was produced.

Example 41

In the same manner as in Example 29, except that, in the preparation of the coating solution of the antistatic layer of Example 29, Denatron P502RG (polythiophene-based conductive polymer, manufactured by Nagase ChemteX Corporation) was replaced by polyanilinesulfonic acid (PAS, polystyrene equivalent weight average molecular weight: 150,000, manufactured by Mitsubishi Rayon Co., Ltd.), an antistatic layer was formed and then an adhesive optical film was produced.

Example 42

In the same manner as in Example 30, except that, in the preparation of the coating solution of the antistatic layer of Example 30, Denatron P502RG (polythiophene-based conductive polymer, manufactured by Nagase ChemteX Corporation) was replaced by polyanilinesulfonic acid (PAS, polystyrene equivalent weight average molecular weight: 150,000, manufactured by Mitsubishi Rayon Co., Ltd.), an antistatic layer was formed and then an adhesive optical film was produced.

Comparative Example 3

In the same manner as in Example 29, except that the antistatic layer was not formed in Example 29, an adhesive optical film was produced.

Evaluation

5) Surface resistance of optical film

In Examples 29 to 42 and Comparative Example 3, each optical film provided with only an antistatic layer (that is, adhesive optical film before forming an adhesive layer) was allowed to stand in an atmosphere at 23° C. and 60% RH. Thereafter, surface resistance of the side of the optical film, on which the antistatic layer had been formed, was measured at an applied voltage of 500 V in an atmosphere at 23° C. and 60% RH by a resistivity meter (Hiresta-Up MCP-HT450, manufactured by Dia Instruments Co., Ltd.) using a USR probe after one minute. The results are shown in Table 2.

6) Adhesion between adhesive layer and optical film

Each of the adhesive films of Examples 29 to 42 and Comparative Example 3 was cut into pieces measuring 25 mm×120 mm to obtain a sample. This sample was aged in an atmosphere at 23° C./60% RH and an atmosphere at 50° C. for one day, respectively. After aging, a release film was removed and a polypropylene porous film was applied onto the adhesive surface of the sample and an adhesive tape (No. 31B, manufactured by Nitto Denko Corporation) was stuck onto the polypropylene porous film to reinforce the sample. Then, the sample was allowed to stand in an atmosphere at 23° C./60% RH and an atmosphere at 50° C. for 24 or more hours. Thereafter, using a two-sided tape, a SUS304 steel plate was stuck onto the back surface (optical film side of the adhesive optical film) of the sample after standing. Using a tensile testing machine, the polypropylene porous film and the sample were separated at an interface therebetween in a 180° direction at a rate of 300 mm/min. After confirming that the adhesive layer adhered to the side of the polypropylene porous membrane, a peel stress was measured. The results are shown in Table 2.

7) Adhesion and fixation of adhesive optical film

Each of the adhesive optical films of Examples 29 to 42 and Comparative Example 3 was cut into pieces measuring 230 mm×310 mm, a release film was removed from the piece, and the resulting cut film was stuck onto a 0.7 mm thick glass plate (CORNING #1737, manufactured by Corning Co.). The resulting specimen was allowed to stand in an autoclave at 50° C. under 0.5 MPa for 15 minutes, heated in an atmosphere at 90° C. and an atmosphere at 60° C./90° RH for 500 hours, and then it was visually observed whether or not peeling of the adhesive optical film occurred. The results are shown in Table 2.

The presence or absence of peeling of the adhesive optical film was evaluated according to the following criteria.

A: Change such as peeling was not observed.

B: Peeling in size of less than 1 mm was observed at the end of the adhesive film.

C: Peeling in size of 1 mm or more was observed at the end of the adhesive film.

8) Haze

In Examples 29 to 42 and Comparative Example 3, each optical film provided with only an antistatic layer (that is, adhesive optical film before forming an adhesive layer) was cut into pieces measuring 50 mm×50 mm and haze was measured by a haze computer HZ-1 (Suga Test Instruments Co., Ltd.). The results are shown in Table 2. Usually, the haze is preferably 2.0 or less. When the haze exceeds 2%, the optical film gives white appearance by visual observation, and this is not preferable.

TABLE 2

| Examples and Comparative Examples | Surface resistance [Ω/□] Optical film (Antistatic layer) | Adhesion between adhesive layer and optical film [N/25 mm] | | Adhesion and fixation of adhesive optical film | | Haze |
|---|---|---|---|---|---|---|
| | | 23° C./60% RH | 50° C. | 90° C. | 60° C./90% RH | |
| Example 29 | $3.9 \times 10^9$ | 6.1 | 11.1 | A | A | 0.5 |
| Example 30 | $7.3 \times 10^9$ | 11.7 | 11.3 | A | A | 0.4 |
| Example 31 | $5.0 \times 10^{10}$ | 7.0 | 9.4 | A | A | 0.4 |
| Example 32 | $2.0 \times 10^{10}$ | 7.2 | 9.5 | A | A | 0.5 |
| Example 33 | $1.0 \times 10^{12}$ | 8.3 | 11.6 | A | A | 0.4 |
| Example 34 | $1.0 \times 10^{11}$ | 4.8 | 8.9 | A | A | 0.5 |
| Example 35 | $2.0 \times 10^{10}$ | 8.0 | 11.0 | A | A | 0.5 |
| Example 36 | $1.0 \times 10^{10}$ | 8.2 | 11.2 | A | A | 0.5 |
| Example 37 | $5.0 \times 10^9$ | 9.0 | 11.5 | A | A | 0.5 |
| Example 38 | $1.0 \times 10^{11}$ | 7.2 | 9.5 | A | A | 0.5 |
| Example 39 | $2.0 \times 10^{10}$ | 8.3 | 15.0 | A | A | 0.5 |
| Example 40 | $1.5 \times 10^{10}$ | 13.0 | 15.0 | A | A | 0.5 |
| Example 41 | $5.0 \times 10^{10}$ | 5.1 | 8.2 | A | A | 0.5 |
| Example 42 | $8.2 \times 10^{10}$ | 8.5 | 10.5 | A | A | 0.5 |
| Comparative Example 3 | $\geq 1.0 \times 10^{14}$ | 4.4 | 4.3 | A | A | 0.3 |

While the illustrative embodiments and examples of the present invention are provided in the above description, such are for illustrative purpose only and it is not to be construed restrictively. Modification and variation of the present invention which will be obvious to those skilled in the art are to be covered in the following claims.

What is claimed is:

1. An adhesive film comprising:
   a base material;
   an adhesive layer laminated on one or both sides of the base material; and
   an under coat layer containing at least one compound selected from the group consisting of zirconium alkoxide, zirconium chelate, zirconium acylate, titanium alkoxide, titanium chelate, titanium acylate, aluminum alkoxide, aluminum chelate and aluminum acylate, which is interposed between the base material and the adhesive layer, wherein the under coat layer contains a resin.

2. The adhesive film according to claim 1, wherein the adhesive layer has a reactive functional group.

3. The adhesive film according to claim 1, wherein the resin has a reactive functional group.

4. The adhesive film according to claim 1, wherein the adhesive layer is made of a water dispersible acrylic adhesive.

5. The adhesive film according to claim 1, wherein the base material is an optical film.

6. An adhesive film comprising a base material, an adhesive layer laminated on at least one side of the base material, and an antistatic layer interposed between the base material and the adhesive layer, the adhesive layer being made of an adhesive composition comprising, as raw monomers, an alkyl(meth)acrylate ester whose alkyl group has 4 to 18 carbon atoms, a carboxyl group-containing vinyl monomer and a phosphoric acid group-containing vinyl monomer represented by the following general formula (1), and also optionally comprising, as raw monomers, a copolymerizable vinyl monomer which is copolymerizable with the above monomers, wherein with respect to a proportion of the raw monomers, an amount of the alkyl (meth)acrylate ester is from 60 to 99 parts by weight based on 100 parts by weight of a total amount of the raw monomers, and a total amount of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers, the antistatic layer contains a water soluble or water dispersible conductive material;

wherein formula (1) is as follows:

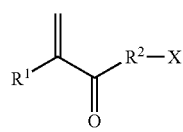
(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3),

(2)

in the general formula (2), n represents an integer of 1 to 4, and m represents an integer of 2 or more, and

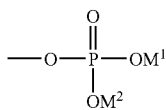
(3)

in the general formula (3), $M^1$ and $M^2$ each independently represents a hydrogen atom or a cation.

7. The adhesive film according to claim 6, wherein the adhesive composition further contains, as the copolymerizable vinyl monomer, an alkoxysilyl group-containing vinyl monomer, the proportion being from 0.001 to 1 part by weight based on 100 parts by weight of the total amount of the raw monomers.

8. The adhesive film according to claim 6, wherein the adhesive composition is a water dispersible adhesive composition.

9. The adhesive film according to claim 6, wherein the water soluble or water dispersible conductive material is a conductive polymer.

10. The adhesive film according to claim 9, wherein the conductive polymer is polyaniline and/or polythiophene.

11. The adhesive film according to claim 6, wherein the water soluble or water dispersible conductive material is an organometallic compound.

12. The adhesive film according to claim 11, wherein the organometallic compound is at least one compound selected from the group consisting of an organozirconium compound, an organotitanium compound and an organoaluminum compound.

13. The adhesive film according to claim 6, wherein the antistatic layer further contains an oxazoline group-containing polymer.

14. The adhesive film according to claim 6, wherein the antistatic layer further contains a mixture of an oxazoline group-containing polymer and a compound having a plurality of carboxyl groups.

15. The adhesive film according to claim 6, wherein the antistatic layer further contains a polyamine-based polymer.

16. The adhesive film according to claim 6, wherein the base material is an optical film.

17. An image display device comprising at least one adhesive film,
the adhesive film comprising an optical film, an adhesive layer laminated on at least one side of the optical film, and an antistatic layer interposed between the optical film and the adhesive layer,
the adhesive layer being made of an adhesive composition comprising, as raw monomers, an alkyl(meth)acrylate ester whose alkyl group has 4 to 18 carbon atoms, a carboxyl group-containing vinyl monomer and a phosphoric acid group-containing vinyl monomer represented by the following general formula (1), and also optionally comprising, as raw monomers, a copolymerizable vinyl monomer which is copolymerizable with the above monomers, wherein
with respect to a proportion of the raw monomers, the amount of the alkyl(meth)acrylate ester is from 60 to 99 parts by weight based on 100 parts by weight of the total amount of the raw monomers, and a total amount of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and
a carboxyl group concentration is from 0.05 to 1.50 mmol/g and a phosphoric acid group concentration is from 0.01 to 0.45 mmol/g in the raw monomers,
the antistatic layer contains a water soluble or water dispersible conductive material;
wherein formula (1) is as follows:

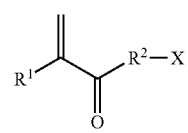
(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3),

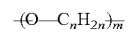
(2)

in the general formula (2), n represents an integer of 1 to 4, and m represents an integer of 2 or more, and

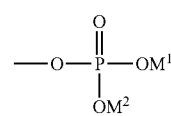
(3)

in the general formula (3), $M^1$ and $M^2$ each independently represents a hydrogen atom or a cation.

* * * * *